United States Patent [19]

McMahon

[11] 4,208,651
[45] Jun. 17, 1980

[54] FINGERPRINT IDENTIFICATION BY RIDGE ANGLE AND MINUTIAE RECOGNITION

[75] Inventor: Donald H. McMahon, Carlisle, Mass.

[73] Assignee: Sperry Corporation, New York, N.Y.

[21] Appl. No.: 910,810

[22] Filed: May 30, 1978

[51] Int. Cl.$^2$ .............................................. G06K 9/12
[52] U.S. Cl. ............................................ 340/146.3 E
[58] Field of Search ........... 340/146.3 AC, 146.3 AE, 340/146.3 J, 146.3 H, 146.3 MA, 146.3 E, 149 R, 149 A

[56] References Cited

U.S. PATENT DOCUMENTS

| | | | |
|---|---|---|---|
| 3,271,761 | 9/1966 | Kuang-Chi Hu | 340/146.3 AC |
| 3,582,889 | 6/1971 | Bodez | 340/146.3 E |
| 3,585,592 | 6/1971 | Kiji et al. | 340/146.3 AC |
| 3,786,416 | 1/1974 | Bhimani | 340/146.3 AE |
| 3,968,475 | 7/1976 | McMahon | 340/146.3 E |
| 4,003,024 | 1/1977 | Riganati et al. | 340/146.3 H |
| 4,015,240 | 3/1977 | Swonger et al. | 340/146.3 E |
| 4,083,035 | 4/1978 | Riganati et al. | 340/146.3 E |
| 4,087,788 | 5/1978 | Johannesson | 340/146.3 AE |

*Primary Examiner*—Leo H. Boudreau
*Attorney, Agent, or Firm*—Howard P. Terry

[57] ABSTRACT

A raster scanning laser beam and cooperating light detector generate a stream of binary coded data, which data are processed to yield an organized binary pattern of ridge angle data. Location of secondary data representing only one side of the fingerprint ridges is then accomplished and that data is locally stored. As a further descriptor of the print, non-paired ridge endings are identified. While retaining the advantages inherent in ridge angle processing for identification, the recognition system makes use of non-paired selected line end minutiae data as a fine descriptor, comparing the location of such minutiae with respect to predetermined points of the fingerprint pattern, so affording a final assessment of match validity.

17 Claims, 25 Drawing Figures

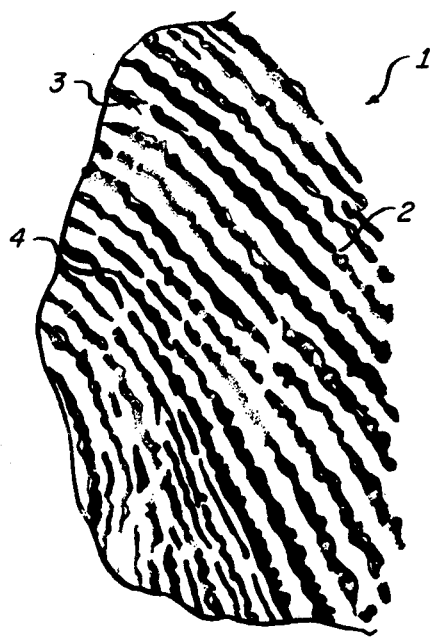
FIG.1.
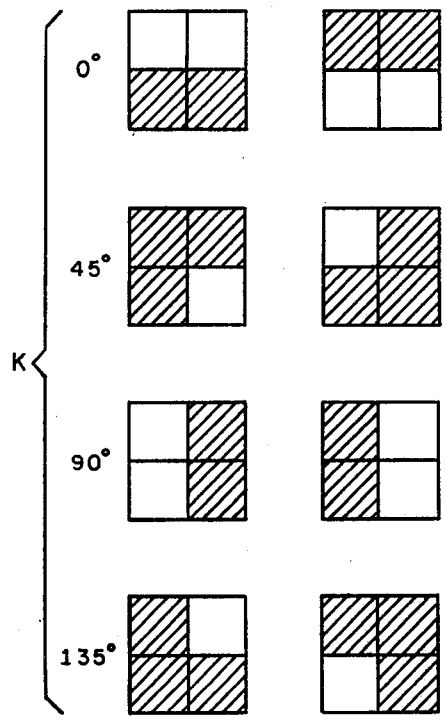
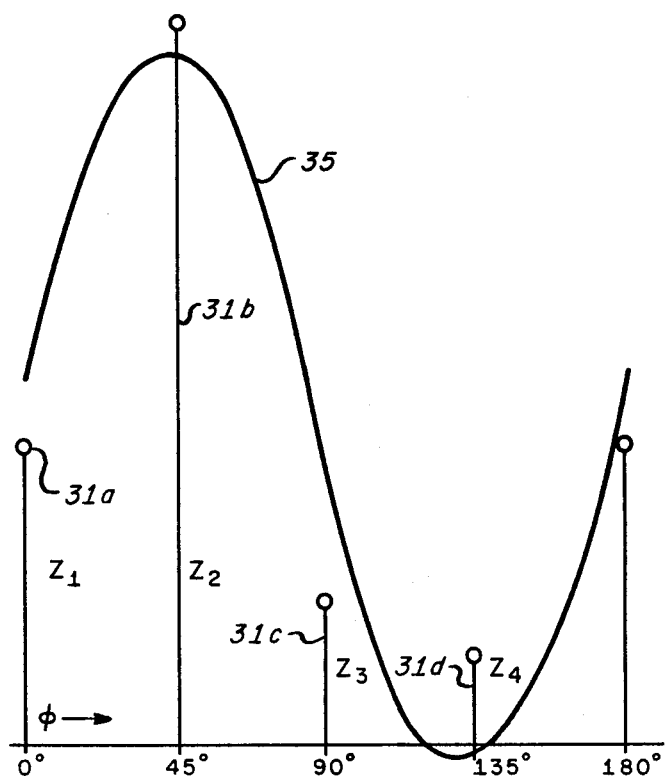
FIG.5.
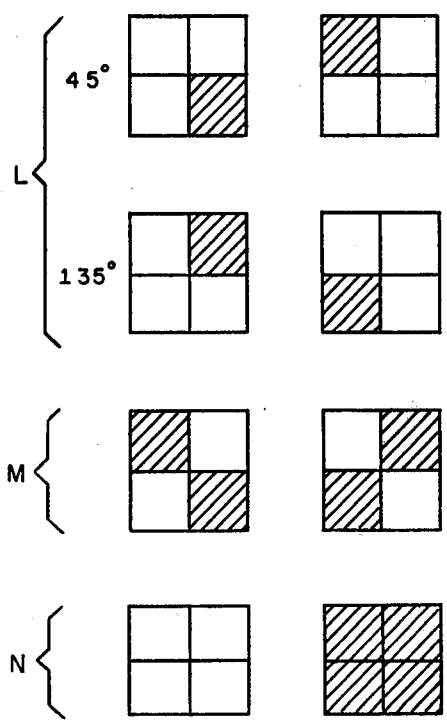
FIG.4.

$$Z = A \cos (2)(\theta + \phi)) + B \qquad (1)$$

$$\Sigma = \sum_{i=1,2,3,4} \left[ Z_i - A \cos (2\theta_i - 2\phi) - B \right]^2 \qquad (2)$$

$$\frac{\alpha \Sigma}{\alpha B} = \frac{\alpha \Sigma}{\alpha \phi} = \frac{\alpha \Sigma}{\alpha A} = 0 \qquad (3)$$

$$\frac{\alpha \Sigma}{\alpha B} = \sum \left[ Z_i - A \cos (2\theta_i - 2\phi) - B \right] = 0 \qquad (4)$$

$$\cos (2\phi + 180°) = -\cos 2\phi \qquad (5)$$

$$B = (Z_1 + Z_2 + Z_3 + Z_4)/4 \qquad (6)$$

$$\frac{\alpha \Sigma}{\alpha \phi} = \sum \left[ (Z_1 - B) - A \cos (2\theta_i - 2\phi) \right] \cdot A \sin (2\theta_i - 2\phi) \qquad (7)$$

$$(Z_1 - Z_3) \sin 2\phi - (Z_2 - Z_4) \cos 2\phi = 0 \qquad (8)$$

$$\cos 2\phi = \frac{Z_1 - Z_3}{\sqrt{(Z_1 - Z_3)^2 + (Z_2 - Z_4)^2}} \qquad (9)$$

$$\sin 2\phi = \frac{Z_1 - Z_4}{\sqrt{(Z_1 - Z_3)^2 + (Z_2 - Z_4)^2}} \qquad (10)$$

$$\frac{\alpha \Sigma}{\alpha A} = 2 \sum \left[ (Z_1 - B) - A \cos (2\theta_i - 2\phi) \right] \cdot \cos (2\theta_i - 2\phi) = 0 \qquad (11)$$

$$A = \frac{1}{2} \sqrt{(Z_1 - Z_3) + (Z_2 - Z_4)} \qquad (12)$$

$$\phi = \frac{1}{2} \tan^{-1} \left[ (Z_2 - Z_4)/(Z_1 - Z_3) \right] \qquad (13)$$

FIG. 6.

| PATTERN TYPE | 2X2 BOX INPUTS | | | | RIDGE ANGLE INPUTS | | | |
|---|---|---|---|---|---|---|---|---|
| | $D_1$ | $D_2$ | $D_3$ | $D_4$ | $S_1 S_2$ | $S_1 \overline{S_2}$ | $\overline{S_1} S_2$ | $\overline{S_1} \overline{S_2}$ |
| — | 1 | 1 | 1 | 1 | | | | |
| 7 | 1 | 1 | 1 | 0 | | * | | |
| 5 | 1 | 1 | 0 | 1 | | * | * | * |
| 6 | 1 | 1 | 0 | 0 | | * | | * |
| 1 | 1 | 0 | 1 | 1 | * | | | |
| 8 | 1 | 0 | 1 | 0 | | | | |
| — | 1 | 0 | 0 | 1 | | | | |
| — | 1 | 0 | 0 | 0 | | | | |
| 3 | 0 | 1 | 1 | 1 | * | | * | * |
| — | 0 | 1 | 1 | 0 | | | | |
| 4 | 0 | 1 | 0 | 1 | * | * | * | * |
| — | 0 | 1 | 0 | 0 | | | | |
| 2 | 0 | 0 | 1 | 1 | * | | * | |
| — | 0 | 0 | 1 | 0 | | | | |
| — | 0 | 0 | 0 | 1 | | | | |
| — | 0 | 0 | 0 | 0 | | | | |

FIG. 8.

FIG. 9.
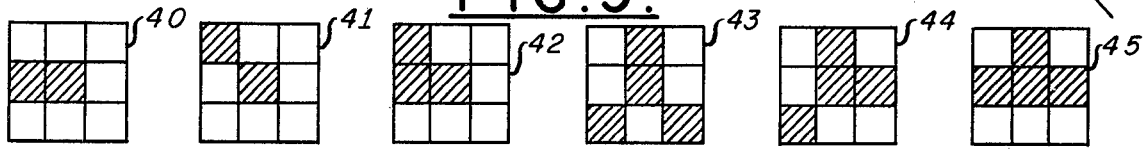
FIG. 10.
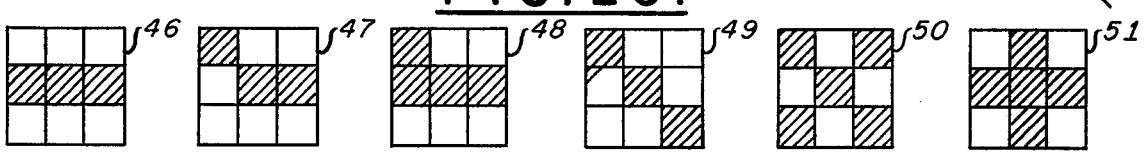
FIG. 11.
| QUAD. 1 | QUAD. 2 | QUAD. 3 | QUAD. 4 | PATTERN TYPE |
|---|---|---|---|---|
| $S_1=S_2=1$ | $S_1=0$ $S_2=1$ | $S_1=S_2=0$ | $S_1=1$ $S_2=0$ | |
| − | − | + | + | |
| − | − | − | + | |
| − | − | − | − | |
| + | − | − | − | |
| + | + | − | − | |
| + | + | + | − | |
| + | + | + | + | |
| − | + | + | + | |

INPUT LABEL DESIGNATION FOR FIG.15B
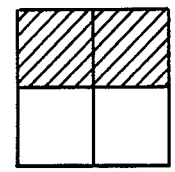
FIG.15A.
$Z_1 = D_1 D_2 \bar{D}_3 \bar{D}_4 + \bar{D}_1 \bar{D}_2 D_3 D_4$   0°
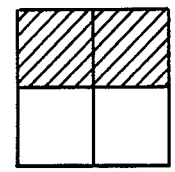
$Z_2 = \bar{D}_1 D_2 D_3 D_4 + D_1 D_2 D_3 \bar{D}_4$   45°
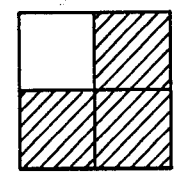
$Z_3 = \bar{D}_1 D_2 \bar{D}_3 D_4 + D_1 \bar{D}_2 D_3 \bar{D}_4$   90°
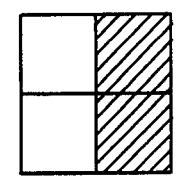
$Z_4 = D_1 \bar{D}_2 D_3 D_4 + D_1 D_2 \bar{D}_3 D_4$   135°
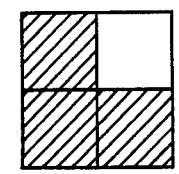
FIG.15B.
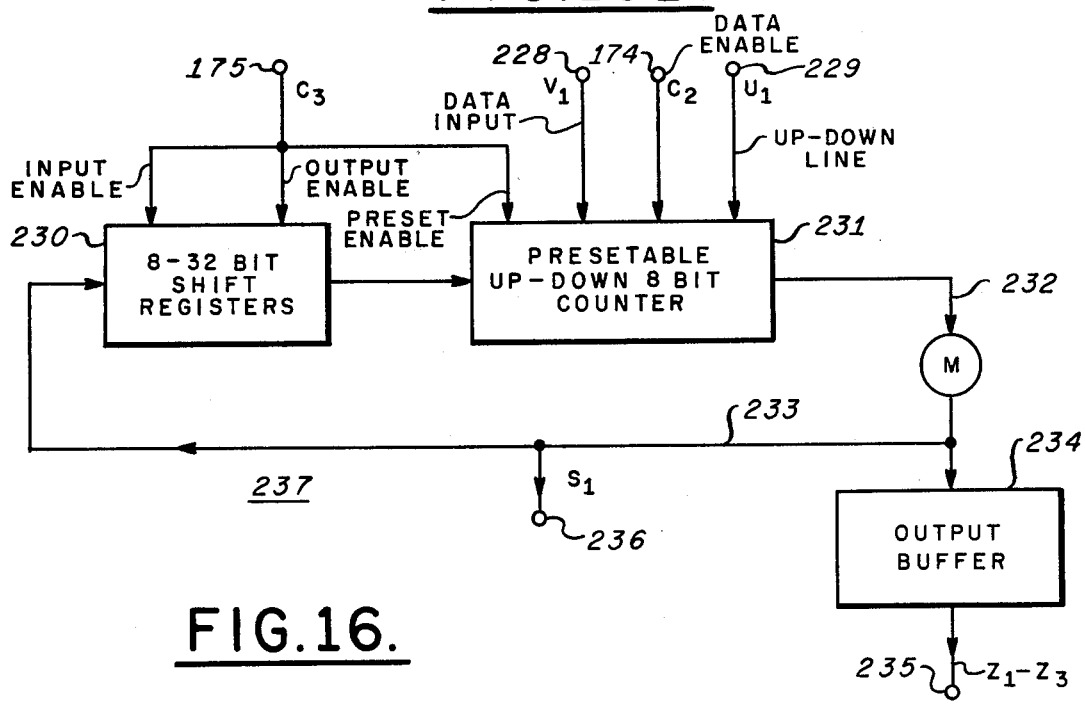
FIG.16.

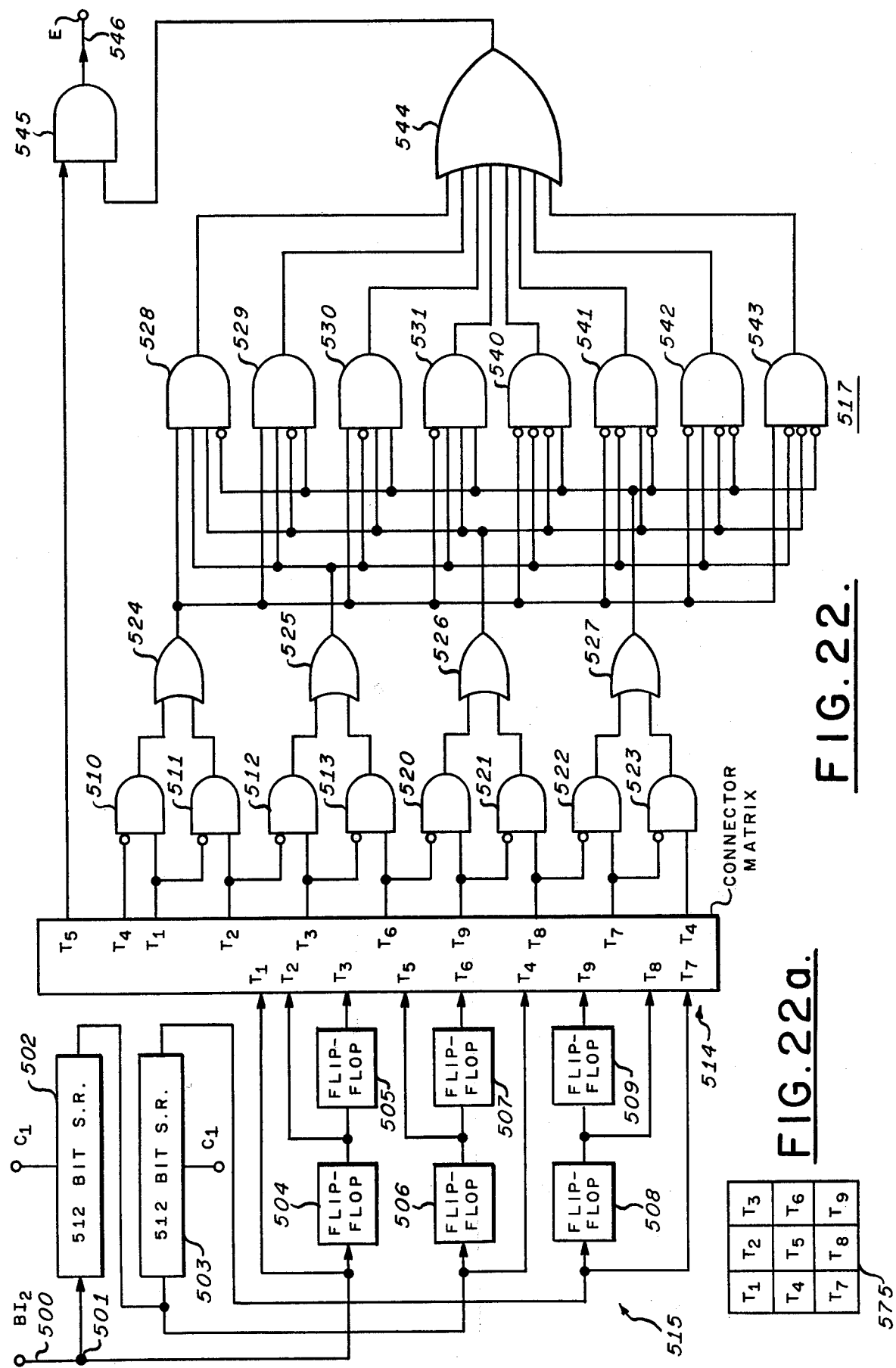

FINGERPRINT IDENTIFICATION BY RIDGE ANGLE AND MINUTIAE RECOGNITION

BACKGROUND OF THE INVENTION

1. Field of the Invention

The invention relates generally to the optical processing of line patterns or of similar data that must be processed for pattern recognition purposes and, more particularly, to automatic optical surveying of such patterns for the generation of binary coded data patterns suitable for processing or storage by digital processing or other pattern recognition apparatus.

2. Description of the Prior Art

The art is known to include optical systems for the analysis of fingerprint patterns that employ matched optical filtering or cross-correlation techniques and the direct comparison of a fingerprint image to be identified with prerecorded fingerprint images. In addition, related techniques enable comparison between the Fourier transform of a fingerprint image to be identified with prerecorded Fourier transforms of fingerprints. Such optical systems have often involved rapidly rotating, highly specialized optical filter elements generally disposed in the Fourier transform plane of an optical processor for cyclically selecting distinct components of the Fourier transform for transfer to an image plane for detection there and for subsequent processing. Data representing ridge line angular orientation is generally developed, though the spacing between ridges may also be derived. Representative concepts of this type of recognition apparatus appear in the following U.S. Pat. Nos. assigned to Sperry Rand Corporation in the name of the present inventor:

3,771,124—"Coherent Optical Processor Fingerprint Identification Apparatus", issued Nov. 6, 1973, 3,771,129—"Optical Processor Fingerprint Identification System", issued Nov. 6, 1973, 3,873,970—"Fingerprint Identification Apparatus", issued Mar. 25, 1975 (with W. T. Maloney), 3,882,462—"Fingerprint Recognition Apparatus Using Non-Coherent Optical Processing", issued May 6, 1975, 3,891,968—"Coherent Optical Processor Apparatus With Improved Fourier Transform Plane Spatial Filter", issued June 24, 1975, and 3,968,476—"Spurious Signal Removal in Optical Processor Identification Apparatus", issued July 6, 1976.

With respect to other well known prior art concepts which are generally antecedents of the foregoing, such as the standard computer processing technique which directly uses detailed images of fingerprints, these concepts attempt rather directly to imitate past manual or partially automated systems, such as those in which manually derived fingerprint measurements are entered into the memory of a data processor for electronic searching. However, the combination of prohibitive cost, low reliability, and low effective search speeds characterizes such approaches. The major problem exhibited by them is concerned with the large amount of data collected, so that to improve speed and accuracy, a decision must be made as to what information should actually be selected from that data total and how the selection can be most expeditiously accomplished to afford rapid, accurate operation.

An advantageous approach has been proven to be that used in principle in the above listed patents in which patterns of ridge angle data over the print surface are catalogued. For example, the merits of such ridge angle measurement and processing techniques are generally set forth in the D. H. McMahon, G. L. Johnson, S. L. Teeter, C. G. Whitney technical paper: "A Hybrid Optical Computer Processing Technique for Fingerprint Identification", I.E.E.E. Transactions on Computers, Vol. C-24, No. 4, April 1973, pages 358 through 369. It is found that the ridge angle representation of an original fingerprint pattern contains significantly less total data than a binary image representation of that original pattern and, in general, that the ridge angle representation adequately describes only the significant features of the original pattern, eliminating much unneeded data. Thus, approaches generating and using such ridge angle data are readily capable of more rapid operation in classifying fingerprint patterns and in fingerprint file searching based, for example, on the usual record file of ten prints. Inherent in the ridge angle data as a function of position on the print is the gross structure of the original pattern and the presence of cores and deltas, for example, is readily observed. Recognition of such features or descriptors not only supplies a means for extraction of significant data defining the structure of the print, but also guarantees that such descriptors will be independent of the positioning of the original print.

Even in the earliest classification systems, such as those based on four well-defined and highly reliable types; i.e., arches, left loops, right loops, and whorls, it is found that it is possible for significant numbers of people to have the same pattern types even on all ten respective fingers. Additional discrimination is customarily accomplished to a certain degree of success by counting the number of skin ridges between predetermined points on the fingerprint pattern. However, the additional discriminatory information thus derived is not fully sufficient, and reliable identification requires time-consuming visual examination of fine details of the prints, including special topological characteristics of the print pattern known as minutiae. The visual observation of the presence of minutiae such as bifurcations or ridge endings has been made, along with their spatial relationships in terms of ridge count and location relative to the aforementioned predetermined points. Before the use of computer minutiae comparison techniques, this final step in the determination of a true match was carried out only by visual inspection which, as noted, is expensive and time consuming.

SUMMARY OF THE INVENTION

The present invention is an arrangement for the optical and computer processing of line patterns such as fingerprint line patterns for automatic pattern comparison and recognition purposes. The invention provides automatic optical surveying of such line patterns for the generation of a stream of representative binary coded patterns suitable for manipulation or storage by special purpose digital processing apparatus for pattern recognition. A simple optical scanning system is arranged to generate the flow of binary coded data by raster scanning of the original print or image. The scanning system may employ horizontal deflection of a laser light beam while the print to be examined is moved vertically. The light reflected by the print and collected by a photocell varies in level according to the variation of the line pattern. Operation of the optical system may be generally similar to that described in the D. H. McMahon U.S. patent application Ser. No. 874,450, filed Feb. 2, 1978 for an "Optical Reader for Multiline Image Processing", assigned to Sperry Rand Corporation or to that disclosed herein.

Starting with the stream of binary image data signals, these are processed to yield and locally to store an organized pattern of ridge angle data. The location of the data representing one side of the fingerprint ridges follows, providing a binary data stream for storage from which can be reconstructed a modified image of the original fingerprint. Generation of the line, single-side data represents an additional step in eliminating a volume of data not essential to the problem. The fingerprint characteristic selected for use as the descriptor in the present invention, in addition to ridge angle, is the feature generally known as ridge minutiae. While several types of local anamolies of ridge characteristics are called minutiae, including enclosure, islands, crossings, bifurcation, and trifurcation, only non-paired ridge endings and bifurcations are of interest for present purposes, other types of minutiae being decomposable into a multiplicity of ridge endings or bifurcations. In this process, ridge line ends are first detected, after which the presence of generally co-lineal or paired line ends, characteristic of ridge line breaks or gaps, are detected and data corresponding to them is eliminated.

Accordingly, while retaining the benefits of the ridge angle approach to basic recognition of fingerprint line patterns used in the Fourier transform processing apparatus of the aforementioned patents, the invention additionally makes selected use of minutiae in the original print as a fine structural descriptor of the line pattern, comparing the position of such selected minutiae with respect to predetermined points of the line pattern to afford a final validity assessment of the match. The invention also retains the benefits of the ridge angle detector system, while employing reliable, relatively inexpensive optical components, thus avoiding rapidly rotating parts to perform specialized filtering functions, which parts, in themselves, are delicate and expensive to manufacture and which present problems of reliability and proper alignment along an optical axis. While such problems are readily solved as in the systems of the foregoing patents, the present concept is also desirable in certain circumstances because it simplifies the optical hardware.

BRIEF DESCRIPTION OF THE DRAWINGS

FIG. 1 is a view of a portion of a human fingerprint showing characteristic features.

FIG. 4 aids in classifying and defining the useful or non-useful nature of data patterns indicating ridge angle data.

FIG. 5 is a graph useful in explaining the invention with respect to ridge angle direction.

FIG. 6 contains thirteen equations useful in explaining the invention.

FIG. 8 is a truth table from which a Boolean equation for $BI_2$ is to be developed.

FIGS. 9 and 10 represent ridge line end and line continuation data patterns.

FIG. 11 is a truth table illustrating eight characteristics of ridge line end patterns according to the quadrant in which the ridge angle falls.

FIGS. 15A and 15B are tables useful in explaining the purposes and operation of the FIG. 14 sub-system.

FIG. 16 is an electrical block diagram of a register-counter system driven by the outputs of the system of FIG. 14.

FIG. 22 is a detailed wiring diagram of an electrical circuit for recognizing fingerprint line ends employing $BI_2$ input data.

FIG. 22A is a diagram of use in explaining the operation of the FIG. 22 recognition sub-system.

DESCRIPTION OF THE PREFERRED EMBODIMENTS

GENERAL

A binary image is to be constructed of data corresponding to a typical fingerprint pattern such as pattern 1 of FIG. 1. For the sake of discussing a typical approach to the problem according to the present invention, it will be assumed that the binary image picture will be 512 or $2^9$ bits wide and 512 bits high, though the novel method to be described is actually independent of the number of binary elements in each direction. For further initial illustration of the novel method, it is assumed only for the moment that the appropriate reader device has extracted the binary data from the actual fingerprint image 1 and that this binary data now resides as words in a conventional main memory of a binary data processing system.

In the case of the assumed binary image picture, the image is organized into 16,384 words of sixteen bits each. For the sake of clarity, certain additional non-unusual assumptions are made, such that each of the 16,384 words represents sixteen adjacent horizontally disposed bits of picture data, that the recorded binary image data begins at the upper left hand corner of the picture with word number one, that the most significant digit of word number one represents the most leftward bit of picture information, that word number one occupies bit positions from zero through fifteen on the first horizontally scanned line, that word number two is similarly constituted and occupies bit positions from sixteen through thirty one, et cetera. With this particular convention, line number two begins at word number thirty three, line number three at word number sixty five, et cetera.

Figure 2:
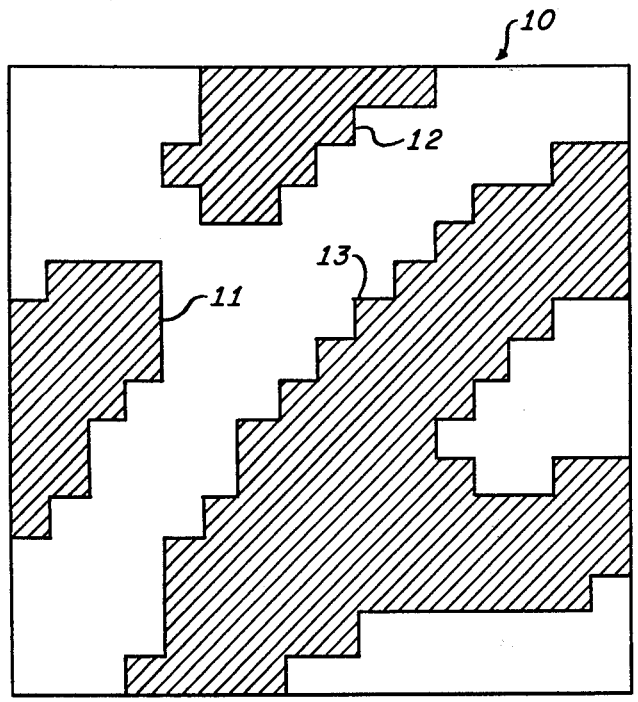
FIG. 2 represents a portion of a binary fingerprint pattern.
Figure 3:
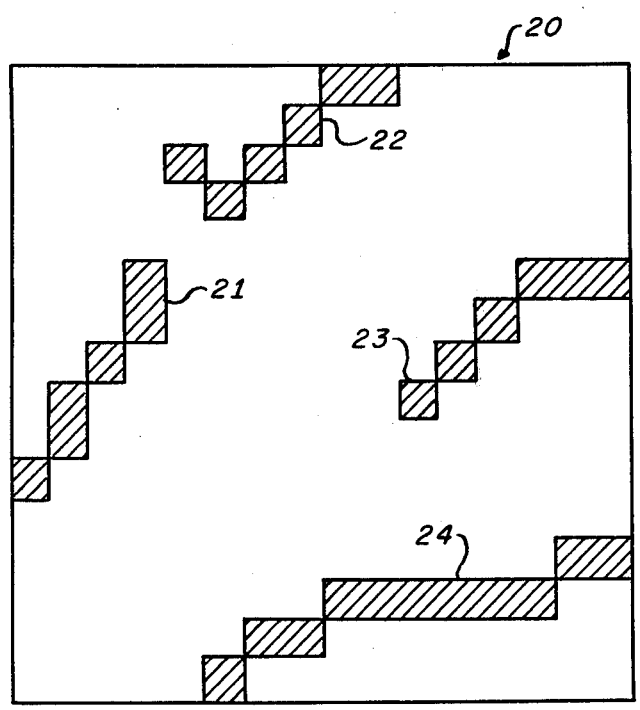
FIG. 3 represents a modification of FIG. 2, showing binary data for only one side of the fingerprint ridges of FIG. 2.

The processing steps according to the present invention will be described in detail, but may be summarized as follows. Briefly, the first step in the sequence of steps is to divide the 512 by 512 binary array into thirty-two by thirty-two sub-arrays of sixteen by sixteen bits each. The second step lies in determining the azimuthal orientation of the fingerprint ridge pattern in each sixteen by sixteen sub-array for which sufficient binary information is present for the purpose. The third step is to use such ridge angle information to locate image positions corresponding to one side only of all ridge line edges. FIG. 2 represents a typical sixteen by sixteen sub-array portion of a binary fingerprint pattern 10 having ridge lines corresponding to areas 11, 12, and 13 and FIG. 3 represents the desired pattern 20 obtained after the third processing step, illustrating the data of FIG. 2 modified to show data only for one side of the fingerprint ridges, as at 21, 22, 23, 24.

The fourth step of the process is to locate all end points of the single edged line pattern of FIG. 2, because these end points represent the possible presence of the sought-for minutiae locations. The fifth step is to pair off false minutiae locations so that they may be eliminated from the scene. This step rids the data of all pairs of neighboring line ends that occur as at 2 in FIG. 1, either at breaks in an otherwise continuous fingerprint ridge or at locations as at 3 in FIG. 1 where ink used to form the original fingerprint pattern bridges valleys between adjacent ridge lines. Only true minutiae as at 4 in FIG. 1 are to be detected as far as present purposes are concerned.

The result of the several foregoing process steps is a stored list of locations of such minutiae locations in terms of their x and y coordinates. For purposes of fingerprint identification, ridge angle direction $\theta$ would also be stored as an additional qualifier of the minutiae coordinate locations. In a typical identification step, two sets of x, y and $\theta$ data would be used to correlate a sampled fingerprint pattern with a stored pattern. A correlation score may be derived that indicates whether or not the two sets of fingerprint data represent the same fingerprint.

RIDGE ANGLE EXTRACTION

For practicing the foregoing sequence of steps leading to the extraction of minutiae position and ridge angle data, a binary signal processor system may be employed which starts the operation by extracting the desired ridge angle data.

The smallest data set capable of yielding any sort of ridge angle information consists simply of a two bit by two bit sample which, as seen in FIG. 4, represents a sample of nearly the smallest region of the binary image pattern and will be spoken of herein for convenience as a two by two box. By inspection of FIG. 4, if the four binary values in such a box are all one's (black) or all zero's (white) as at N, no ridge directional information is present. Thus, it is seen that ridge directional data inherently occurs only at the edge of ridge lines for which the box contents contain both zero and one data. In FIG. 4, the sixteen possible box patterns indicate corresponding ridge angle data. Because there are only four bits in each box, the angle information that can be derived consists of only four pseudo-vector directions (one can clearly distinguish only between ridge orientation directions of the group K boxes for 0°, 45°, 90°, and 135°, but not between 0° and 180°, 45° and 225°, et cetera). Other possible box patterns include the four redundant angle patterns L, two indeterminate patterns M, and the two patterns N which yield no data, as shown in FIG. 4. However, if these angle data contributions are summed over the 256 possible box locations in a sixteen by sixteen sub-array, it will be seen that a considerably more accurate estimate of the ridge angle $\theta$ can be obtained.

Thus, the sum of counts in the four directions is to be made to yield the angle measurement of higher precision. Let:

$Z_1$ = number of 0° boxes,
$Z_2$ = number of 45° boxes times $\sqrt{2}$,
$Z_3$ = number of 90° boxes, and
$Z_4$ = number of 135° boxes times $\sqrt{2}$, The $\sqrt{2}$ factors for $Z_2$ and $Z_4$ are introduced to make allowance for the fact that a count in a diagonal direction yields a vector $\sqrt{2}$ times longer than a count at 0° or 90°. FIG. 5 represents a plot of vector lengths 31a, 31b, 31c, 31d as a function of angular direction $\theta$ in the form 35 of a least mean square sinusoidal fit. In FIG. 5, there has been presented data for only four discrete directions out of a continuum of possible directions. Since angular directions of ridges on a fingerprint pattern are defined modulo 180°, it is apparent that the angular coordinates can be extended arbitrarily in the $\pm \theta$ directions and that the data points may be filled in by setting $y(\theta \pm 180) = y(\theta)$. The data can therefore be presented as the periodic function 35. It will be apparent that the fingerprint ridge direction corresponds to the point on the sinusoidal curve of FIG. 5 having the highest ordinate value. The problem is to find a simple curve which optimally fits the available data and to use the functional dependence so obtained to calculate the angle corresponding to the peak ordinate value.

The approach used in the invention is to employ a sinusoidal function which repeats every 180° and to find the optimum fit to the data points using the conventional least mean square criterion (in what follows, the numbered equations are found in FIG. 6). The most general form of a sinusoidal function of the required periodicity is defined in Equation (1), where measured values are available of Z for $\theta = 0, 45, 90$, and 135 degrees. In Equation (1), Z is a theoretical function used to fit the observed values of $Z_1, Z_2, Z_3, Z_4$ to a cosine curve as the simplest such repetitive function; Z is expected to vary with $\theta$, the direction of the vector count. The values $Z_i$ and $\theta_i$ are examples, respectively, of Z and $\theta$ where i = 1, 2, 3, 4 for 0°, 45°, 90°, 135°. The particular values of Z and $\theta$, i.e., $Z_i$ and $\theta_i$, are measured values. The values of A, $\theta$, and B are determined by the best curve fit using the least mean square criterion. The value A is the amplitude of the cosine function and B is a fixed constant present because $Z_i$ values are never negative. Hence, the average value of the function fit must be positive. The value $\theta$ is the phase of the fitted curve; to find the direction of maximum curve values, only $\theta$ needs to be known. The actual values of A and B need not be known, but the ratio of A to B does give information about the reliability of the calculated peak direction; namely, if A is small compared to B, the calculated direction is not reliable.

The least mean square method requires minimizing as defined by Equation (2). In Equation (2), the symbol $\Sigma$ merely stands for the least mean square sum; i.e., the quantity to be minimized to determine the best curve fit. The desired minimization is accomplished by seeking values of the parameters A, B, and $\phi$ to satisfy the identity of Equation (3). Carrying out the first search step, Equation (4) is obtained. But, by using the $\Sigma$ trigonometric identity of Equation (5), Equation (4) is simplified to yield Equation (6).

Carrying out the second search yields Equation (7) and substituting the values of $Z_i$ and $\theta_i$ and simplifying the resulting expression ultimately yields Equation (8). Now, consider the trial solutions expressed by Equations (9) and (10). If Equations (9) and (10) are substituted in Equation (8), Equation (8) is satisfied and therefore, Equations (9) and (10) represent the sought-for solution.

Carrying out the third search yields Equation (11). Again, by inserting the values of $y_i$ and $\theta_i$ into Equation (11), simplifying, and using Equation (8), Equation (12) is obtained yielding the amplitude factor A. This least mean square correlation yields the desired result, that the peak value of the sinusoidal function of Equation (1) occurs for $\theta = \phi$ where $\phi$ is given by Equations (9) and (10). The ridge orientation $\phi$ of the fingerprint pattern in the associated region is therefore given by Equation (13). The quadrant of $2\phi$ is indicated by the signs of $(Z_1-Z_3)$ and of $(Z_2-Z_4)$. In the example illustrated in FIG. 2, $Z_1-Z_3=8$ and $Z_2-Z_4=23$. Therefore, the ridge angle value $\phi$ for the sample is 38.1°.

Figure 7:
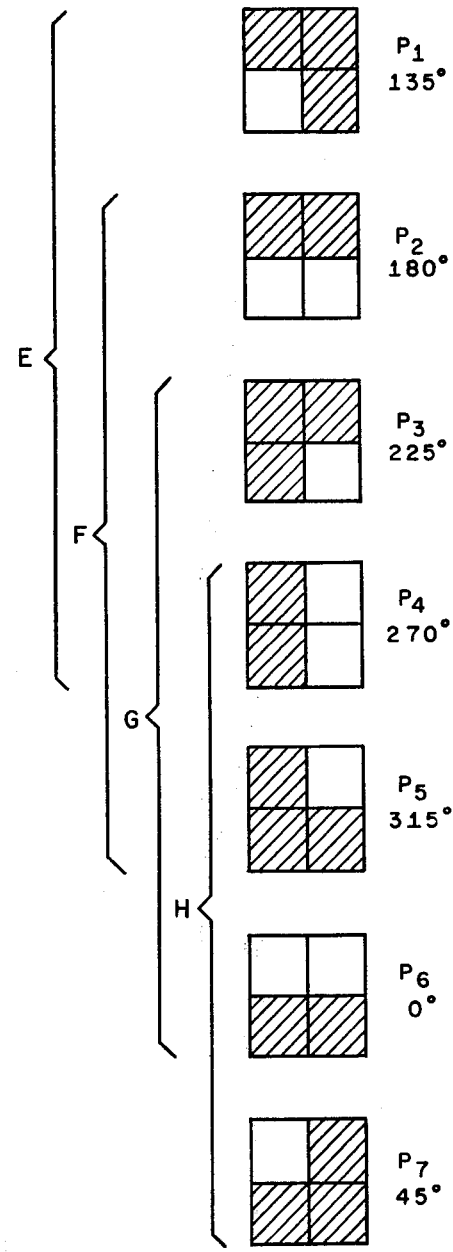
FIG. 7 further aids in classification of fingerprint ridge angles for generation of the one-sided line edge image data.

It is convenient at this point and with reference to FIG. 7 to distinguish between four possible cases depending upon the quadrant of $2\phi$:
Case 1: $0° \leq \phi \leq 45°$ for which $(Z_1-Z_3) \geq 0$, $(Z_2-Z_4) \geq 0$,
Case 2: $45° < \phi \leq 90°$ for which $(Z_1-Z_3) < 0$, $(Z_2-Z_4) \geq 0$,
Case 3: $90° < \phi < 135°$ for which $(Z_1-Z_3) < 0$, $(Z_2-Z_4) < 0$, and
Case 4: $135° \leq \phi < 180°$ for which $(Z_1-Z_3) \geq 0$, $(Z_2-Z_4) < 0$. It is seen that the signs of the quantities $(Z_1-Z_3)$ and $(Z_2-Z_4)$ suffice to discriminate between the four possible cases and to encompass the entire range of values of $\phi$. Again for future reference, it is convenient here to designate the sign of $(Z_1-Z_3)$ by $S_1$ and the sign of $(Z_2-Z_4)$ by $S_2$. The sign values of $S_1$ and $S_2$ are digital signal levels such that $S_1=1$ if $(Z_1-Z_2) \geq 0$ and $S_1=0$ if $(Z_1-Z_3)<0$ and such that $S_2=1$ if $(Z_2-Z_4) \geq 0$ and $S_2=0$ if $(Z_2-Z_4)<0$.

LOCATION OF ONE SIDE OF FINGERPRINT RIDGES

It is now assumed that a sixteen-bit by sixteen-bit sub-array has been examined for a given fingerprint ridge and that it has been determined which of the four categories the ridge angle of the 16 bit by 16 bit array falls into in terms of the sign values of $S_1$ and $S_2$. To convert the binary image pattern into a one sided pattern, only four of the eight possible two-bit by two-bit pattern types of FIG. 7 are recognized, depending on the values of $S_1$ and $S_2$. The E patterns of FIG. 7 are to be recognized if $S_1=S_2=1$. The F patterns are to be recognized if $S_1=1$ and $S_2=0$. The G patterns are to be recognized if $S_1=S_2=0$. The H patterns are to be recognized if $S_1=0$, $S_2=1$. In terms of the categories E, F, G, and H. FIG. 7 indicates those patterns which are to be recognized. Recognition of such a correct pattern generates a one value in the corresponding location of a second binary image pattern representing the fingerprint.

The one-side edge determination sub-system has as its input a sixteen-bit by sixteen-bit binary image pattern and its output is a sixteen by sixteen pattern that contains one values only at edge points on one side of all fingerprint ridge lines within the scene. The role of the previously discussed angle calculating sub-system was to use $S_1$ and $S_2$ to distinguish between the two sides of the fingerprint ridge line thereby representing each separate ridge line as a string of connected one bits, the string having a width of one data bit. In a second mode of operation the entire array of fingerprint data may be used.

The generation of the one-sided image has two purposes. First, it converts all ridge ends into simple line patterns that can be recognized using a three by three picture element box. Second, it eliminates the need for examining the structure within a three-bit by three-bit box unless the central location of that box contains a one value. The first purpose is significant in practicing the invention, because it makes the determination of the presence of minutiae possible by use of an optical procedure for inspecting only a minimum-sized box. The second purpose is also beneficial because it eliminates the need for inspection of three-bit by three-bit arrays for ninety percent of all image positions due to the high scarcity of one data relative to zero data for one-sided, single edge line images.

The simplicity and efficiency of this procedure is required to achieve a satisfactory processor. The three-bit by three-bit box is the minimum sized array which can detect line ends. However, three-bit by three-bit boxes containing binary information can contain up to $2^9$ or 512 possible patterns as compared to the sixteen possible with two-bit by two-bit box patterns. With the present approach, tree branch coding is sufficiently fast in examining each three-bit by three-bit box, since only a small percentage of the image locations requires examination.

The binary pattern of a two-bit by two-bit box contains four data bits. For convenience, these data bits will be labeled as $D_1$ for the upper corner of the box, $D_2$ for the upper right corner, $D_3$ for the left lower corner, and $D_4$ for the lower right corner (FIG. 8). Accordingly, it is now seen that there are six bits of information that must be supplied to the ridge line edge-determining sub-system: $S_1$, $S_2$, and $D_i$, where i = 1, 2, 3 or 4. In FIG. 8, $\overline{S}_1$ and $\overline{S}_2$ are the inverted digital signal levels of $S_1$ and $S_2$, respectively. FIG. 8 is a truth table indicating by asterisk when a one output is to be generated in terms of the several inputs. When operating sequentially on binary data, this one output produces the one-side ridge line pattern.

DETECTING LINE ENDS

The output of the one-side ridge line generator is a binary data stream from which can be reconstructed a modified image of the original fingerprint pattern. For simplicity, this new data or secondary stream will be labeled the $BI_2$ stream, which is now collected and reassembled to form three-bit by three-bit box patterns of modified image data. As previously noted, the three-bit by three-bit boxes are to be examined only if the central bit of the pattern is a one.

Inasmuch as the modified image pattern consists of line segments one data bit wide, two categories of three-bit by three-bit box patterns are readily recognized: line continuation patterns and line end patterns. Accordingly, the function of the next processing sub-system is to recognize only line end patterns, eliminating all line continuation patterns from further manipulation. Because all minutiae of the fingerprint pattern have now been converted into line ends, the line end recognition process must function with substantially perfect accuracy.

FIGS. 9 and 10 respectively illustrate representative line end patterns 40 through 45 and line continuation patterns 46 through 51. It is readily seen that the two distinct types of patterns are easily distinguishable, the line end patterns of FIG. 9 being characterized by an odd number of lines converging at the central bit, while line continuations of FIG. 10 are characterized by an even number of lines converging at the central bit. The number of lines converging at the center of the box can most easily be counted simply by noting the number of zero to one transitions (ignoring one to zero transitions) proceeding once around the periphery of the three-bit by three-bit box pattern. It is readily understood that there can be no more than four zero to one transitions and, hence, no more than four lines can converge at the single central point of a box.

Recalling that only the line end patterns are of interest for further processing, it is further observed that these may be divided as in FIG. 11 into eight major types depending upon the position of the peripheral bit or bits which are in the one state as shown by the representations in the eight rows of the figure. These eight major types can then be regrouped into two classes depending upon the quadrant in which the ridge angle falls; i.e., the state of the sign bits $S_1$ and $S_2$.

The regrouping of the eight patterns of FIG. 11 into two classes is of major significance in the operation of the invention. With the established convention that the ridge direction $\phi$ lies between 0° and 180°, the positive line end classification must depict a decrease by one in the total number of fingerprint ridges. On the other hand, a negative classification always depicts an increase by one in the number of ridges moving along the ridge direction toward the fiducial direction. This procedure will not distinguish between ridge ends and bifurcations, but that distinction is prone to error when the finger is under-or over-inked or if there is smudging. By contrast, the distinction between the increasing and the decreasing of the ridge count when following along the ridge direction is virtually immune to the foregoing readily occurring sources of error.

PAIRING OF LINE END PATTERNS

Breaks in fingerprint lines produce a pair of adjacent-line end indications, as do ink bridges between adjacent ridge lines. Since one of the two line end indications represents a decrease by one in the number of ridges and the associated line end indication represents an increase by one in the number of ridges, it is clear that one line end of the pair must have been classified as positive and the other as negative. The utility of classifying line ends as positive or negative stems from the fact that all defects in the continuous flow of a fingerprint ridge pattern except for true minutiae must be characterized by the presence of two adjacent line ends of opposite polarity classification. However, there is an exception that must be dealt with; namely if one line end of a pair lies in a sixteen-bit by sixteen-bit sub-array belonging to the fourth quadrant of $2\phi$, and the other line end of the pair lies in a sixteen-bit by sixteen-bit sub-array belonging to the first quadrant of $2\phi$, the pairing off must take place between members of the same rather than of opposite sign. This discrepancy results from the fact that the fiducial direction of $\phi$ in the fourth quadrant is nearly opposite to the fiducial direction of $\phi$ in the first quadrant.

It is the further function of the pairing step to eliminate the pairs of line end patterns caused by breaks or bridges in ridge line patterns leaving, at the end of the pairing step, only true minutiae indications. Optimum pairing requires that there be selected for each line end the nearest line end of the opposite sign. In most cases, pairs of line end patterns are separated by sufficient distances from other line end patterns that no confusion can arise. In some cases in which the fingerprint image is of poor quality, many line end patterns occur in a single small area of the total fingerprint pattern. In such cases, mispairing may occasionally occur, but the net result will normally be that the residual line end representing a minutiae is displaced by several ridge lines from its true location.

On the average, there are roughly 500 to 1000 line end indications in each fingerprint, a quantity of data not unreasonable to handle with the capability and speed of available digital processing techniques. Thus, all data associated with line end indications may be processed in carrying out the pairing step. The information to be processed in binary form includes:

(a) the x coordinate of the line end,
(b) the y coordinate of the line end,
(c) the ridge angle values $Z_1$-$Z_3$ and $Z_2$-$Z_4$, and
(d) the eight bits representing the line end pattern type;

these indicate the binary state of the eight circumferential bits of a three by three box (FIG. 11).

INSTRUMENTATION

Figure 12:
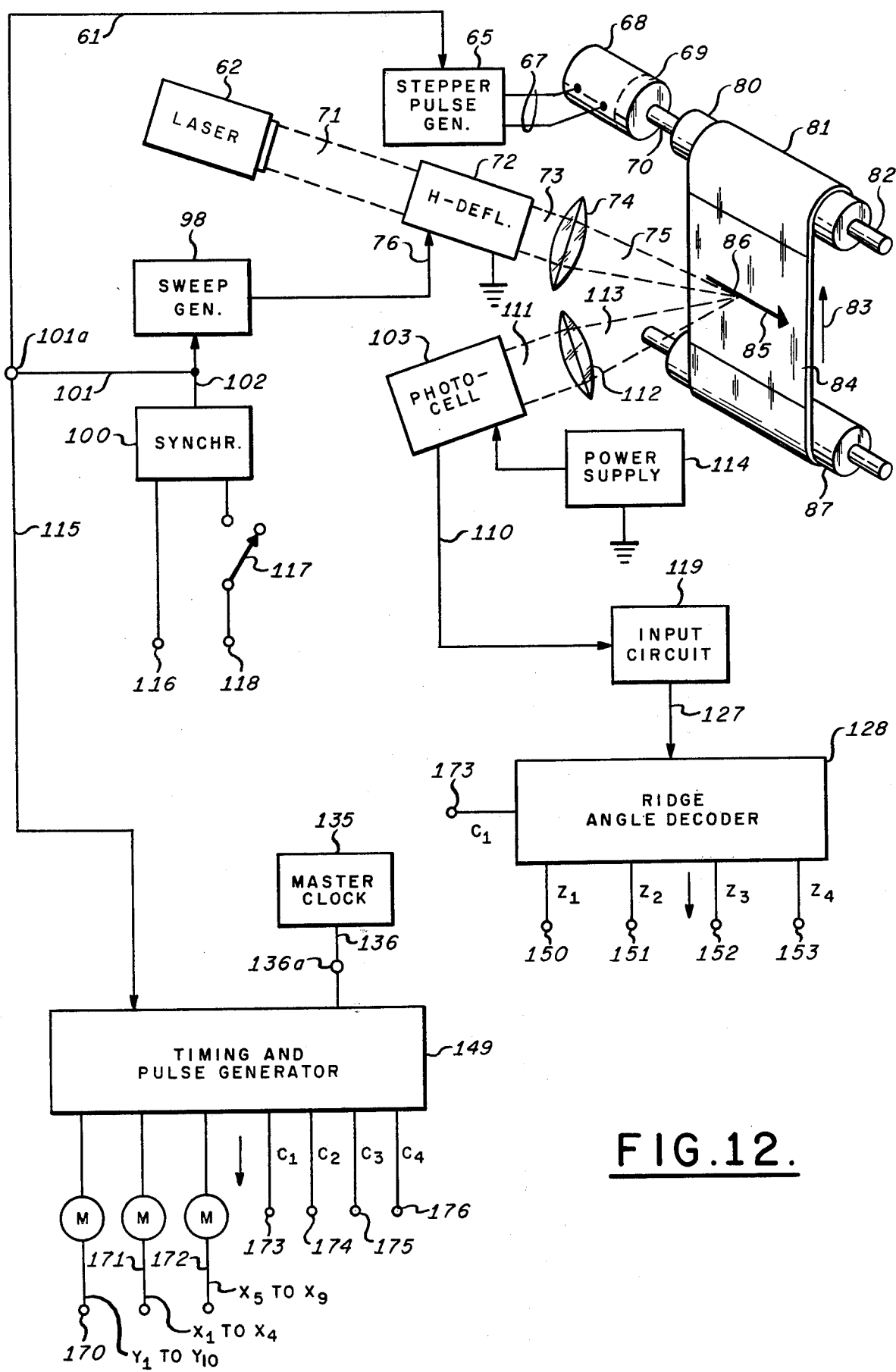
FIG. 12 combines a wiring diagram of the optical sensor system showing optical and electrical components and their interconnections, along with connections to block diagrams of other novel sub-systems of the invention.

In FIG. 12, a light beam 71 from an operating light source such as a laser 62 is transmitted through the optical horizontal deflector 72 to form the horizontally scanned light beam 73. The latter beam 73 is shown in an instantaneous position and is converged by lens 74 as beam 75 to form a small circular spot 86 at an arbitrary location on fingerprint 84. The fingerprint may be disposed on a white card at least temporarily affixed to a movable web 81, for example. A variable quantity of light is reflected from the white card and the fingerprint image upon it, depending upon whether the circular light spot 86 lies mainly on an inked fingerprint ridge or mainly between two adjacent ridges, and a portion 113 of the reflected light is collected by lens 112 to form light beam 111 whose intensity is measured by the conventional photocell 103 enabled by its power supply 114. The diameter of the light spot 86 is adjusted to have a value of approximately one fingerprint ridge width in magnitude. While fingerprint 84 is regularly and repeatedly raster scanned by light spot 86 along a horizontal path such as represented by arrow 85, relatively slow scanning is provided at right angles to arrow 85 by stepped or other rotation of take-up drum 80 in a clockwise sense. Drum 80 is driven, for example, by stepper motor 68 through gearing 69 and shafts 70, 82 to wind the web 81 on which print 84 is disposed, progressively removing web 81 in steps from supply drum 87 and winding it on drum 80 as indicated by arrow 83, for example. In this manner, the immediate print to be examined may progress at right angles to arrow 85 at a regular rate. Other well known means for moving a white card with an inked print 84 in the required manner will be apparent to those skilled in the art. It will also be apparent to those skilled in the art that the web 81 and print 84 will normally lie in a plane perpendicular to that of the drawing, and that a distorted view is shown in the drawing of FIG. 12 merely as a matter of convenience.

The apparatus of the invention is synchronized by synchronizer oscillator 100 when power is supplied from a conventional source (not shown) to terminals 116 and 118 and upon closure of switch 117. It will be obvious that the same switching function may be used simultaneously to supply power to other electrical components of the invention. Synchronizer 100 then supplies control signals via the respective leads 101, 102 for its purpose. Accordingly, it determines the phasing of sweep trigger signals operating within sweep generator 98 to supply horizontal deflection voltages via lead 76 to optical deflector 72. Similarly, it transmits synchronizing signals via leads 101, 61 to stepper pulse generator 65 for the control via leads 67 of motor 68. Synchronizer 100 supplies additional timing signals via leads 102, 101, 115 to the timing and pulse generator 149, which is also under control of master clock 135.

The substantially monochromatic light beam 71 supplied by laser 62, which may be a simple 633 nanometer He-Ne laser, is operated upon by the horizontal optical deflection device 72, which may be a simple galvanometer mirror type of optical scanner; other reflective or transmission devices such as commonly employed for optical memory addressing may be substituted, including the devices of the James B. Thaxter U.S. Pat. No. 3,758,199 for a "Piezoelectrically Actuated Light Deflector", issued Sept. 11, 1973 and assigned to Sperry Rand Corporation. The optical system may employ more complex known lens configurations than the simple lenses 74, 112 for the fingerprint scanning purpose. In any event, the light entering photocell 103 has a rapidly varying amplitude, generating a correspondingly varying electrical signal that is coupled via lead 110 to the input circuit 119 of angle decoder 128, a device remaining to be described.

The apparatus of FIG. 12 generates a plurality of signals upon which operation of the novel system depends. The synchronizer signals on lead 115 and the master clock pulses on lead 136 are utilized in the timing and pulse generator 149 to produce useful output signals on terminals 170 through 176. Terminals 170 of the associated multi-lead cable supply the signals identified as signals $Y_1$ through $Y_{10}$. Terminals 171 of the associated multi-lead cable supply signals $X_1$ through $X_4$. Terminals 172 of the associated multi-lead cable supply output signals $X_5$ through $X_9$. When a minutiae location is identified, the values $Y_1$-$Y_{10}$ are admitted to computer 216 (FIG. 23) as y coordinate data of the minutiae and the $X_1$-$X_9$ values are supplied to the computer as the x coordinate data. Terminals 173 through 176 supply the respective phased output clock pulses $C_1$, $C_2$, $C_3$, and $C_4$ in cooperation with master clock 135. Timing and pulse generator 149 will be described in more detail with respect to FIG. 13 and performs the function of a timing pulse and position coordinate generator. In FIG. 12, terminals 170, 171, 172 correspond to terminals 578, 579 of FIG. 23. Such data is sent to computer 216 only when the presence of a line end is indicated on terminal 546 of FIGS. 22 or 23 and is supplied in the conventional manner via a buffer interface device conventionally present in computer 216.

Figure 14:
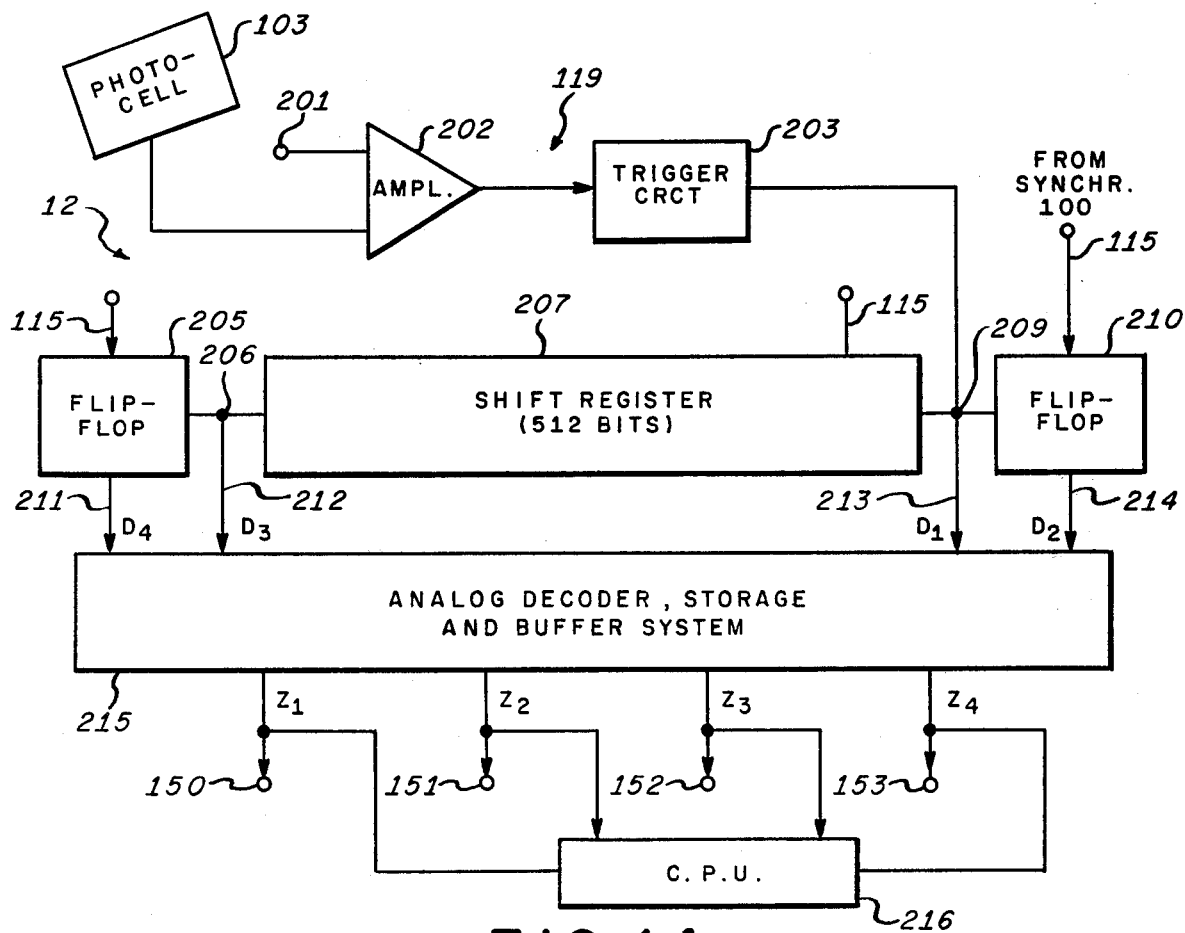
FIG. 14 is an electrical block diagram of the input circuit and ridge angle decoder circuits of FIG. 12.

The varying output of photocell 103 is coupled by lead 110 to the input circuit 119 described more fully with respect to FIG. 14, and thence by lead 127 to ridge angle decoder 128. A further input of decoder 128 is the $C_1$ clock pulse found on terminal 173 of the timing and pulse generator 149. Angle decoder 128 yields on output terminals 150 through 153 the four respective decoded signals $z_1$, $z_2$, $z_3$, and $z_4$ whose use will be further discussed.

Figure 13:
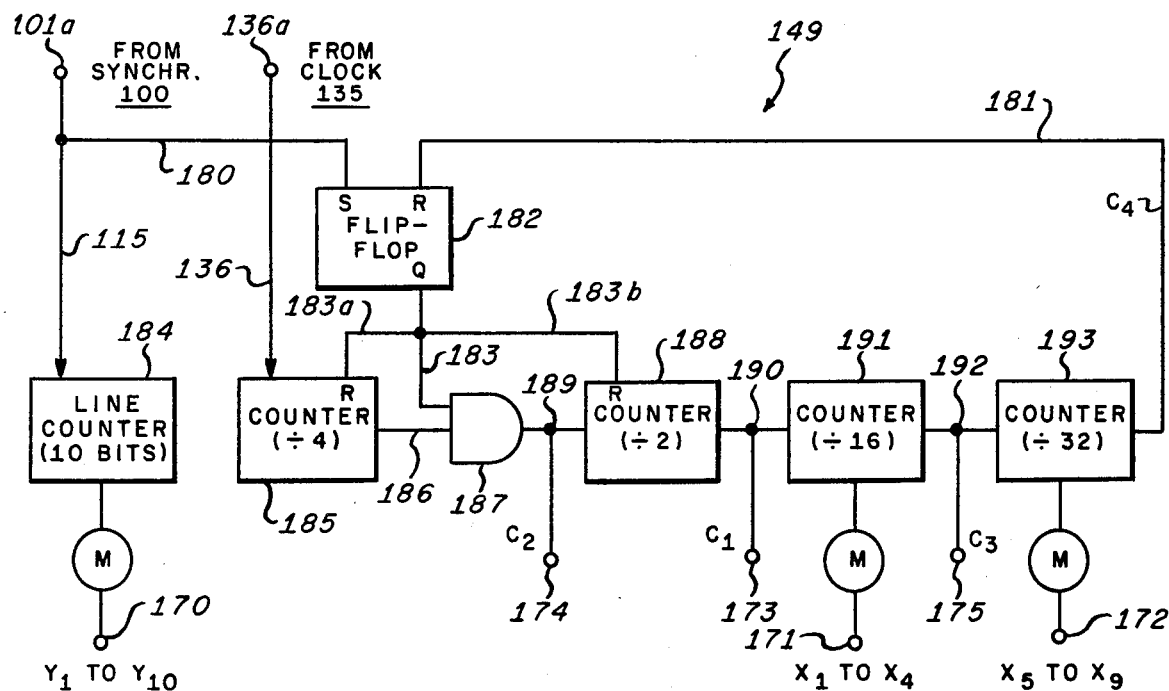
FIG. 13 is an electrical block diagram of the timing and pulse generator of FIG. 12.

Referring now to FIG. 13, which discloses the detailed structure of the timing and pulse generator 149 of FIG. 12, the horizontal sweep timing pulses are coupled by terminal 101a and lead 115 to the conventional ten-bit horizontal line counter 184 to generate the ten-bit code $Y_1$-$Y_{10}$ of terminals 170 indicating the vertical position coordinates on the fingerprint pattern. The sweep timing pulses are also coupled via lead 180 to the set terminal of a conventional flip flop 182, whose Q output on lead 183 has several functions. First, it is a.c. coupled to a reset terminal of a conventional divide-by-four counter 185 via lead 183a also supplied with the master clock pulses by lead 136 and terminal 136a from master clock 135. Second, lead 183 is a.c. coupled to the reset input of divide-by-two counter 188. Third, it is coupled to one input of AND gate 187, whose second input is the output on lead 186 of counter 185. The output of AND gate 187 at junction 189 is the desired $C_2$ clock pulse. That output is coupled serially through divide-by-two counter 188, divide-by-sixteen counter 191, and divide-by-thirty-two counter 193 to form clock pulse $C_4$ on lead 181. The latter is coupled back to the reset input of flip flop 182. The respective junctions 189, 190, 192 of adjacent counters 188, 191, and 193 supply the remaining output clock signals required in FIG. 12 at terminals 173, 174, 175, 176 and 171 and 172. In this manner, clock pulses $C_1$, $C_2$, $C_3$, and $C_4$ respectively appear at terminals 173, 174, 175, and on lead 181. The nine-bit coded signals $X_1$ to $X_4$ arrive at terminal 171 and signals $X_5$ to $X_9$ at terminal 172, the latter indicating the horizontal position of the scan lines.

The circuit of FIG. 13 is so organized that 512 bits of data corresponding to one horizontal scan line are read after the occurrence of each horizontal sweep synchronizing pulse. Because the sweep synchronizer 100 and the master clock 135 both of FIG. 12 operate asynchronously, the divide-by-four counter 185, being reset by each horizontal sweep synchronizer pulse, reduces the horizontal line jitter. The divide-by-sixteen counter 191 splits each horizontal scan line into thirty-two sub-array units, which are then processed separately so as to accumulate the fingerprint ridge angle outputs. Finally, the divide-by-thirty-two counter 193 disables the data taking process via lead 181 after 512 samples are read. Operation remains disabled until the arrival of the next sweep synchronizing pulse.

The first objective of the system of FIG. 12 is to recognize the presence of individual two by two box patterns K of FIG. 4, each box indicating the four elemental quantized angle directions that are actually suitable for use by the system. This operation will be further discussed in connection with FIG. 14, 15A, 15B, and 16. Because the fingerprint is scanned a line at a time to generate the binary image, the data must be stored while sufficient data is being accumulated so that a total box of data may be instantly processed to reconstruct each box pattern. In effect, the binary image of each previous scan line must be stored locally, a process that is conveniently accomplished by the system of FIG. 14 associated with the 512 bit shift register 207 and the analog decoder and buffer circuit 215.

For operation of the device of FIG. 14, the output of photocell 103, which may be a conventional photomultiplier type of device, is directly coupled via one input of differential amplifier 202, whose second input is a reference voltage at terminal 201, to the input of pulse circuit 203, which is preferably a Schmitt trigger circuit producing, when the system is operating, a binary stream of ones and zeroes forming a digitized representation of the fingerprint. The output of trigger circuit 203 is fed via junction 209 to the input of shift register 207, to the input of flip flop 210, which is preferably a J-K flip flop circuit, and via lead 213 to the $D_1$ input of an analog decoder, storage, and buffer circuit 215 such as described in the McMahon U.S. Pat. No. 3,968,475 for a "Digital Processor for Extracting Data From A Binary Image", issued July 6, 1976 and assigned to Sperry Rand Corporation. In turn, the output of flip flop 210 is fed by lead 214 to the $D_2$ input of the decoder portion of circuit 215, and the output of shift register 207 is fed by lead 212 to the $D_3$ input of decoder 215 and to the input of the second J-K flip flop 205 via junction 206. The output of flip flop 205 is also fed via lead 211 to the $D_4$ input of decoder 215. Because the optical and data input system generates a binary data stream of ones and zeroes synchronized with the optical scanning rate, shift register 207 and flip flops 205 and 210 are clocked at the same rate via leads 115 and terminal 101a of FIG. 12.

Assume that there are 512 such clock pulses per optical scan line. If so, binary data bits separated by 512 clock pulses represent neighboring image positions which lie at the same sweep position but on adjacent scan lines. Thus, counting data by counting at any one instant clock pulses from the input, it is seen that the first and second inputs and the 512th and 513th inputs form a two by two data box of binary data as seen in FIG. 15A which is susceptible of being decoded into one of the four possible quantized angle measures K of FIG. 4 or 15B, or into none of them. The four possible K outputs of the decoder, storage, and buffer device 215 of FIG. 14, as taught in the aforementioned patent 3,968,475, appear at terminals 150 through 153 in FIGS. 12 and 14. These four respective $Z_1$, $Z_2$, $Z_3$, and $Z_4$ outputs of the decoder 215 for 0°, 45°, 90°, and 135° are used to drive two separate register-counter systems, yet to be discussed in connection with FIG. 16. The sets of such register-counter systems would be employed to accumulate the total number of net counts of $Z_1-Z_3$ and $Z_2-Z_4$ obtained in each of the 1024 sixteen by sixteen sub-arrays of the fingerprint image. As noted previously, $Z_i = \Sigma Z_i$ values summed over the sixteen-by-sixteen sub-array. The sets of $z_1$, $z_2$, $z_3$, $z_4$ binary data may, apart from the purposes of the present invention, be sent to and stored in the main central storage section of a conventional central processing unit 216 (FIG. 14) where processing steps may be carried out on the data to extract information useful in conventional systems for the comparison of fingerprint patterns, after which the data may be printed out or otherwise conventionally employed according to the problem at hand.

While each of the 1024 sample sub-arrays of the fingerprint pattern could, in theory, have two counters associated with it to accumulate $Z_1-Z_3$ and $Z_2-Z_4$ counts, a very large number of counters would then be required, along with circuits for sequential multiplexing onto a common bus for transmittal into a further part of the processing system. The arrangement to be employed advantageously reduces the number of counters required to only two and allows simultaneous parallel data accumulation to be performed on the linear array of sub-arrays lying along the optical scan direction. The desired end is accomplished as shown in FIG. 16 by the use of two register-counter systems such as system 237 each having eight thirty-two bit registers 230 and a conventional presettable up-down counter 231.

Since both register-counter systems 237 are to operate in a similar manner, it will be necessary to consider in detail only those circuits needed for one of the two register-counter systems 237; for example, that driven by the decoding system 215 of FIG. 14. Let it be assumed that a new optical scan sweep has just begun so that measurements on a new set of thirty-two sample areas has just begun. Consequently, it is assumed that all of the bits of the associated conventional shift register in unit 230 are set to zero, for example. For the first sixteen data pulses, the conventional presettable up-down counter 231 accumulates a count value representing the quantity $Z_1-Z_3$. At this point, the output of counter 231 is sent via multi-lead cables 232, 233 to the input of the corresponding shift register in unit 230; immediately thereafter, the count of the output of that shift register is transferred to the counter 231. Because the shift register transfers a null count, the counter 231 again accumulates a count starting from zero for the next sixteen input data pulses corresponding to the second sampled area. The output of the counter is again shifted to the input of the shift register and the output of the shift register is sent to the counter. The procedure cyclically repeats throughout the entire time of the first optical scan sweep, successively covering each of the thirty-two sampled areas. At the end of the optical scan sweep, additional clock pulses are inhibited until the beginning of the second scan sweep; the resetting of flip-flop 182 of FIG. 13 inhibits master clock pulses from generating $C_1$, $C_2$, $C_3$ pulses until flip flop 182 is set by the next horizontal synchronizing pulse.

Referring still to FIG. 16, clock pulses $C_3$ derived from terminal 175 of FIG. 13 are used as input enable and output enable pulses in the shift registers of unit 230. The same $C_3$ clock pulse serves as a preset enable pulse for counter 231. Counter 231 is additionally supplied with the $C_2$ clock pulse of terminal 174 of FIG. 13 to serve as a data count enable pulse. Terminal 228 supplies $V_1$ data input pulses to counter unit 231, while the $U_1$ pulses that determine whether the counter 231 counts up or down appear on terminal 229. The apparatus of FIG. 16 supplies two outputs. One is the sign signal $S_1$ at terminal 236, that indicates sign by whether or not the most significant bit of the counter is set, and the other is the set of $Z_1-Z_3$ signals on the respective terminals 235 of the multi-lead output cable of output buffer 234, which device operates in conventional fashion. The $V_1$ data signal from a source yet to be explained is a one if either $z_1$ or $z_3$ is present at outputs of FIG. 14. If $z_1$ is present, the $U_1$ input of FIG. 16, yet to be discussed, is a one, forcing the up-down counter 231 to count upward. If $z_3$ is present instead of $z_1$, $U_1$ is set to zero so that the up-down counter 231 subtracts from the counter total. Thus, the FIG. 16 registercounter system 237 generates a total count of $Z_1-Z_3$ values summed over the 256 two by two box locations of the sixteen by sixteen picture element. As has been mentioned, a second registercounter system like that of FIG. 16 is required for calculating $Z_2$-$Z_4$, since the illustrated circuit generates only $Z_1$-$Z_3$. As noted, the sources of $V_1$ and $U_1$ signals are yet to be described. In general, it will be observed that the $U_1$ and $V_1$ signals originate in the ridge angle decoder 128 of FIG. 18. The $V_1$ or $V_2$ values represent the presence of a count, either up or down. The corresponding U values tell whether the V count is up or down. $V_1$ and $U_1$ refer to $z_1$ and $z_3$ inputs, whereas $V_2$ and $U_2$ relate to $z_2$ and $z_4$ inputs.

Before the optical scanning system begins to search the second scan line, the previously accumulated value for the first sample area lies at the output end of the first of shift registers 230 of FIG. 16 ready to be transferred into presettable counter 231. Accordingly, when the second scan is initiated, up-down presettable counter 231 is set to the previously accumulated total representing the first sampled area and automatically continues to count up or down from the new starting point. In this manner, the combination of eight shift registers 230 with the presettable counter 231 accumulates the sum of the total number of $Z_1$-$Z_3$ pulses for all thirty-two sampled areas along the scan line direction during the same time period. After accumulating ridge angle data for sixteen scan events, the final count in each of the thirty two areas is sequentially transferred via buffer 234 and multiple terminal 235 for further processing.

ANGLE DECODER, STORAGE, AND BUFFER SYSTEM MODE 1

Figure 17:
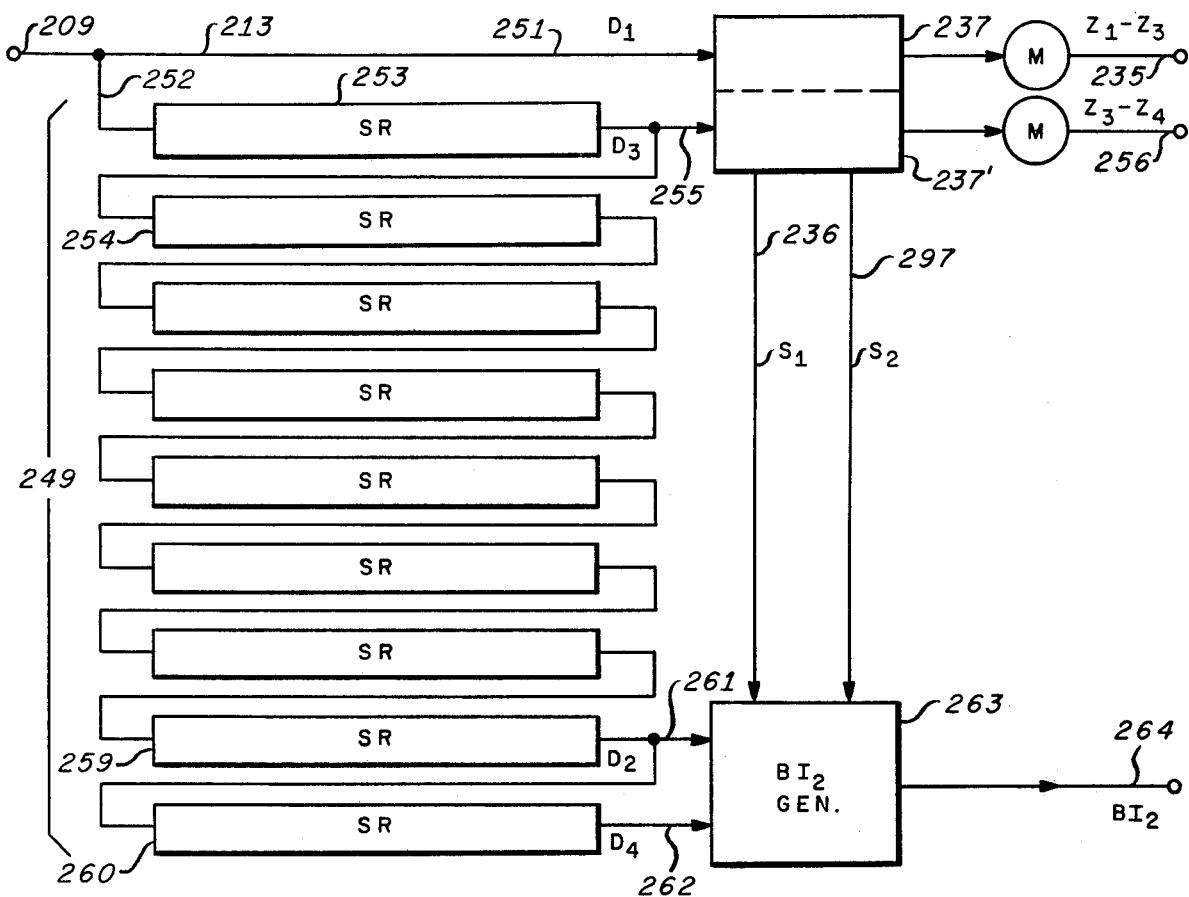
FIG. 17 is an electrical block diagram illustrating one mode of operation of the angle decoder, storage, and buffer system of FIG. 14.

A first operating mode for the angle decoder, storage and buffer system 128 will be discussed in connection with FIGS. 17, 18, and 19. Referring first to FIG. 17, the aforementioned $D_1$ of FIG. 14 is coupled through terminal 209 and lead 213 directly to the input of a shift register-counter unit 237 such as that of FIG. 16. The $D_1$ signal is also serially coupled via lead 252 through a shift register array containing a multiplicity of 512 bit shift registers such as 253, 254, . . . 259, 260, with a final $D_4$ output on lead 262. The output of the first shift register 253 is also coupled as signal $D_3$ to the input 255 of the second shift register-counter unit 237' similar to unit 237. Devices 237, 237' supply the respective $Z_1$-$Z_3$ and $Z_2$-$Z_4$ values via multi-lead cable terminals 235, 256. Units 237, 237', shown in more detail in FIG. 18, also yield the sign signals $S_1$ and $S_2$ on the respective leads 236 and 297. The sign signals $S_1$, $S_2$ and those respective outputs of the shift register array 253, 254, . . . 259, 260 appearing on leads 261 and 262 are coupled into $BI_2$ generator 263 to supply the $BI_2$ value at output terminal 264. The $BI_2$ generator 263 will be discussed in further detail in connection with FIG. 19.

As has been noted in the foregoing discussion, angle data for thirty-two sixteen by sixteen sub-arrays ($Z_1$-$Z_3$ and $Z_2$-$Z_4$ angle data) may be accumulated in parallel for sixteen optical scans, at which time the values are transferred to an output buffer, such as buffer 234 of FIG. 16. Output buffer 234 then supplies the stored constant values for $Z_1$-$Z_3$ or $Z_2$-$Z_4$ for a period corresponding to the next sixteen optical scans. These values are then transmitted, as by terminal 235 of FIG. 16, for use in further processing stages, as for deriving ridge angle direction and for the location of minutiae.

Figure 18:
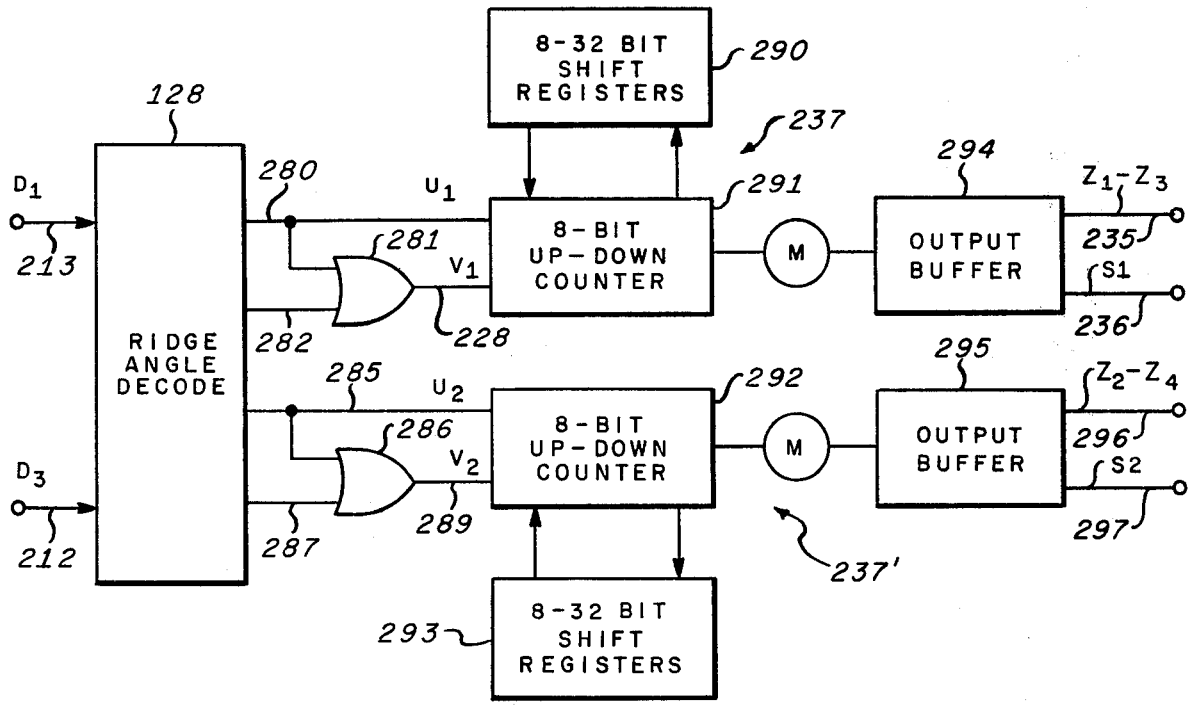
FIG. 18 is an electrical block diagram showing part of the arrangement of FIGS. 16 and 17 in greater detail.

In FIG. 18, the units 237, 237' of FIG. 17 are shown in more detail, the shift registers 290, 293, up-down counters 291, 292, and output buffers 294, 295, are similar to the corresponding elements of FIG. 16. The $D_1$, $D_2$, $D_3$, and $D_4$ signals are used in FIG. 18 to generate the signal pair $U_1$ and $U_2$, which are the up-down signals for controlling the sense of counting by counters 291, 292 of the data signals $V_1$, $V_2$. For example, the $V_1$ and $U_1$ signals are generated from the outputs 280 and 282 of decoder 128, $U_1$ being supplied directly to counter 291 via lead 280. The $V_1$ signal on lead 228 is generated by OR gate 281 from the 280, 282 outputs of decoder 128. Signals $V_2$ and $U_2$ are similarly generated from signals on leads 285, 287 for the control in a similar manner of counter 292. Register 290 cooperates with up-down counter 291 to supply $Z_1$-$Z_3$ signals via output buffer 294, while counter 292 cooperates with register 293 to supply $Z_2$-$Z_4$ signals via output buffer 295.

As in FIG. 17, the sign values $S_1$ and $S_2$ are coupled to inputs of the one-sided ridge or $BI_2$ generator 263; here, they cooperate with a second two by two array of input data, generating a binary output stream representing a one-sided ridge pattern. The details of the $BI_2$ generator circuit are illustrated in FIG. 19 and remain to be discussed. Note that the inputs to the units 237, 237' in FIG. 17 and of the $BI_2$ generator are separated by eight optical scans, so that the one-sided ridge generator $BI_2$ has $S_1$ and $S_2$ sign inputs averaged over the sixteen by sixteen sub-arrays on which it operates.

ANGLE DECODER, STORAGE, AND BUFFER SYSTEM - MODE 2

In the second operating mode for the angle decoding, storage, and buffer system 128, the $Z_1$-$Z_3$ and $Z_2$-$Z_4$ angle data for the thirty-two sixteen by sixteen sub-arrays is continuously accumulated and discarded in parallel. For example, in the arrangement of FIG. 20, two sets 249, 249' of a series of eight connected 512 bit shift registers such as those of FIG. 17 are employed in place of the single set 249 of FIG. 17 and are themselves connected in series at 374. The add-on angle decoder 372 is placed eight optical scans before the $BI_2$ generator input lines 402, 403. The subtract angle decoder 379 is placed eight optical scans after the input lines 402, 403 to $BI_2$ generator 375. In this manner, the $BI_2$ generator 375 inputs are placed in terms of the average angle data for the sixteen optical scan lines surrounding the $BI_2$ input lines 402, 403.

Figure 20:
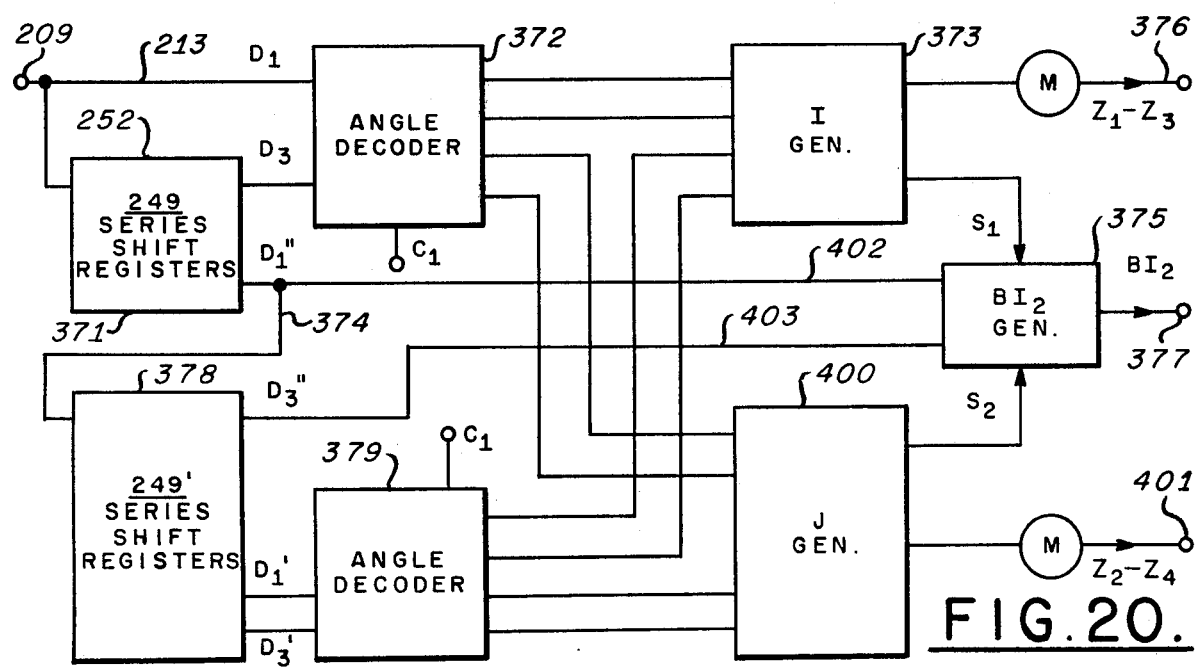
FIG. 20 is an electrical block diagram showing a second mode of operation of the angle decoder, storage, and buffer system of FIG. 14.
Figure 21:
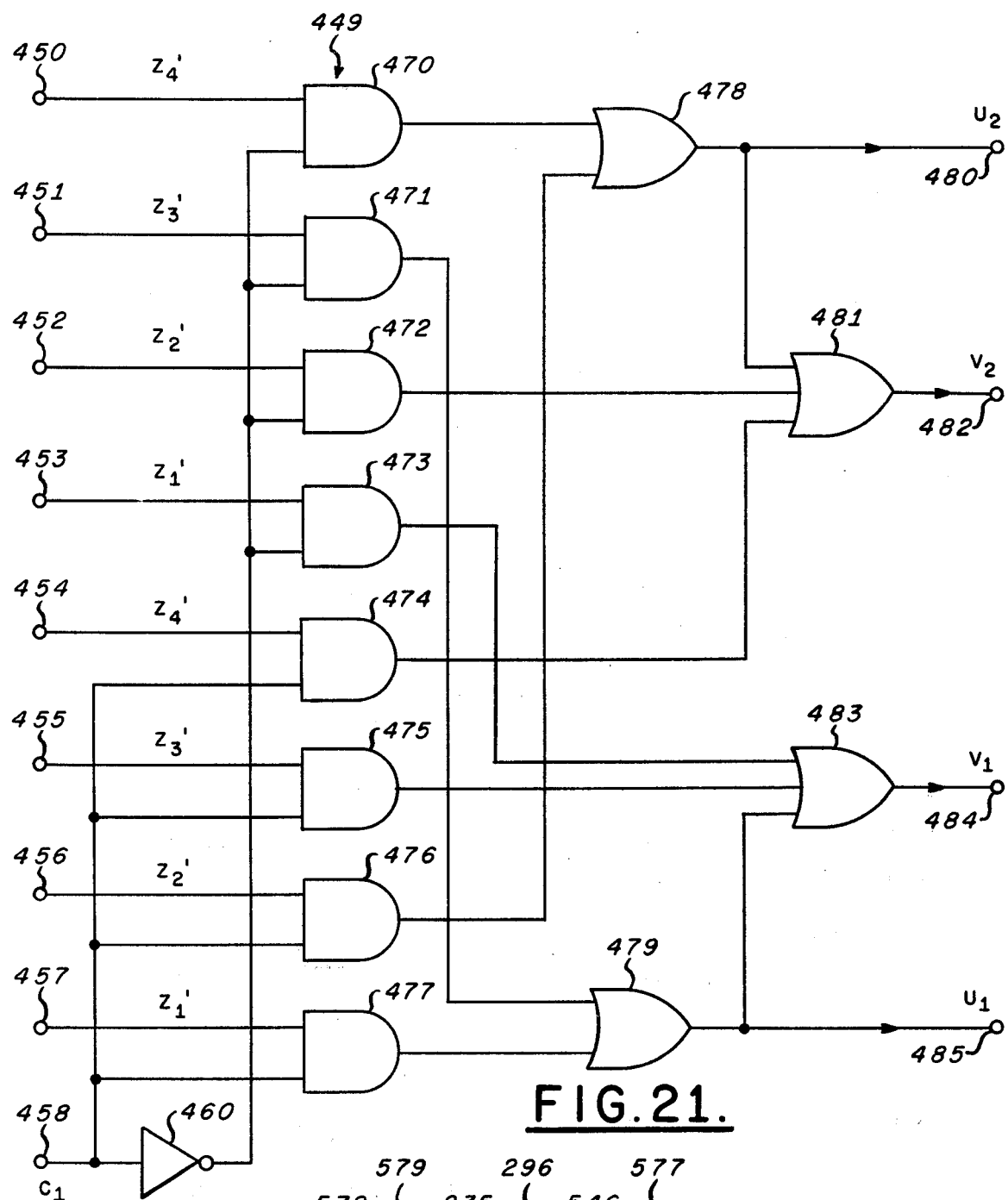
FIG. 21 is a wiring diagram of the I and J generators of FIG. 20 showing electrical components and interconnections.

The I and J signal generators 373, 400 of FIG. 20 are shown in more detail in FIG. 21 where the inputs at the respective terminals 450 to 453 are $z_4'$, $z_3'$, $z_2'$ and $z_1'$, derived from ridge angle decoder 372 of FIG. 20, while the inputs at respective terminals 454 through 457 are $z_4$, $z_3$, $z_2$, and $z_1$ derived from ridge angle decoder 379 of FIG. 20. One each of the foregoing inputs is coupled to one each of an array 499 of AND gates 470 through 477. Clock signals $C_1$ from terminal 458 are coupled directly to second inputs of AND gates 474 through 477 and, after inversion by inverter 460, to second inputs of AND gates 470 through 473. Outputs of AND gates 470, 476 are coupled to dual input OR gate 478. Outputs of AND gates 472, 474 and of OR gate 478 are coupled to triple input OR gate 481. Outputs of AND gates 473, 475 and of OR gate 479 are coupled to triple input OR gate 483. Outputs of AND gates 471, 477 are coupled to the dual input OR gate 479. The desired $U_1$ and $U_2$ signals appear at the respective output terminals 485, 480 of OR gates 479, 478. The desired $V_1$ and $V_2$ output signals appear at the respective output terminals 484, 482 of OR gates 483, 481. The outputs $V_1$, $V_2$, $U_1$, $U_2$ of FIG. 21 feed into correspondingly labeled inputs to the counters 291, 292 of FIG. 18. The outputs $S_1$, $S_2$, $Z_3$, and $Z_2$-$Z_4$ at the right side of FIG. 18 are equivalent to the outputs of the respective I and J generators of FIG. 20.

It is seen that the circuit of FIG. 21 has inputs from both of the respective angle decoders 372 and 379 of FIG. 20. The purpose of the FIG. 21 circuit is to generate a running net total of $Z_1$-$Z_3$ and $Z_2$-$Z_4$ counts for the last sixteen line scans of the fingerprint. Hence a $z_1$ at the beginning of the sixteen line scans or $z_3'$ at the end thereof must produce a unity increase in the count, whereas a $z_3$ or a $z_1'$ must produce a corresponding count decrease. The contributions to the presettable counters 291, 292 (FIG. 18) from the unprimed variables at the beginnings of the sixteen by sixteen blocks are available at the outputs of the FIG. 21 circuit for the one state of clock pulse $C_1$, whereas the contributions from the primed numbers are available for the zero state of clock pulses $C_1$. Clocking the presettable counters at twice the frequency of the $C_1$ pulses by using the $C_2$ clock pulses allows all contributions to be read into the up-down counters 291, 292. The V data and the up-down signals U from terminals 480, 485 of FIG. 21 are used on leads 280, 228, 285, 289 to drive counters 291, 292 (also as in FIG. 16).

ONE-SIDED RIDGE LINE PATTERN GENERATOR

Figure 19:
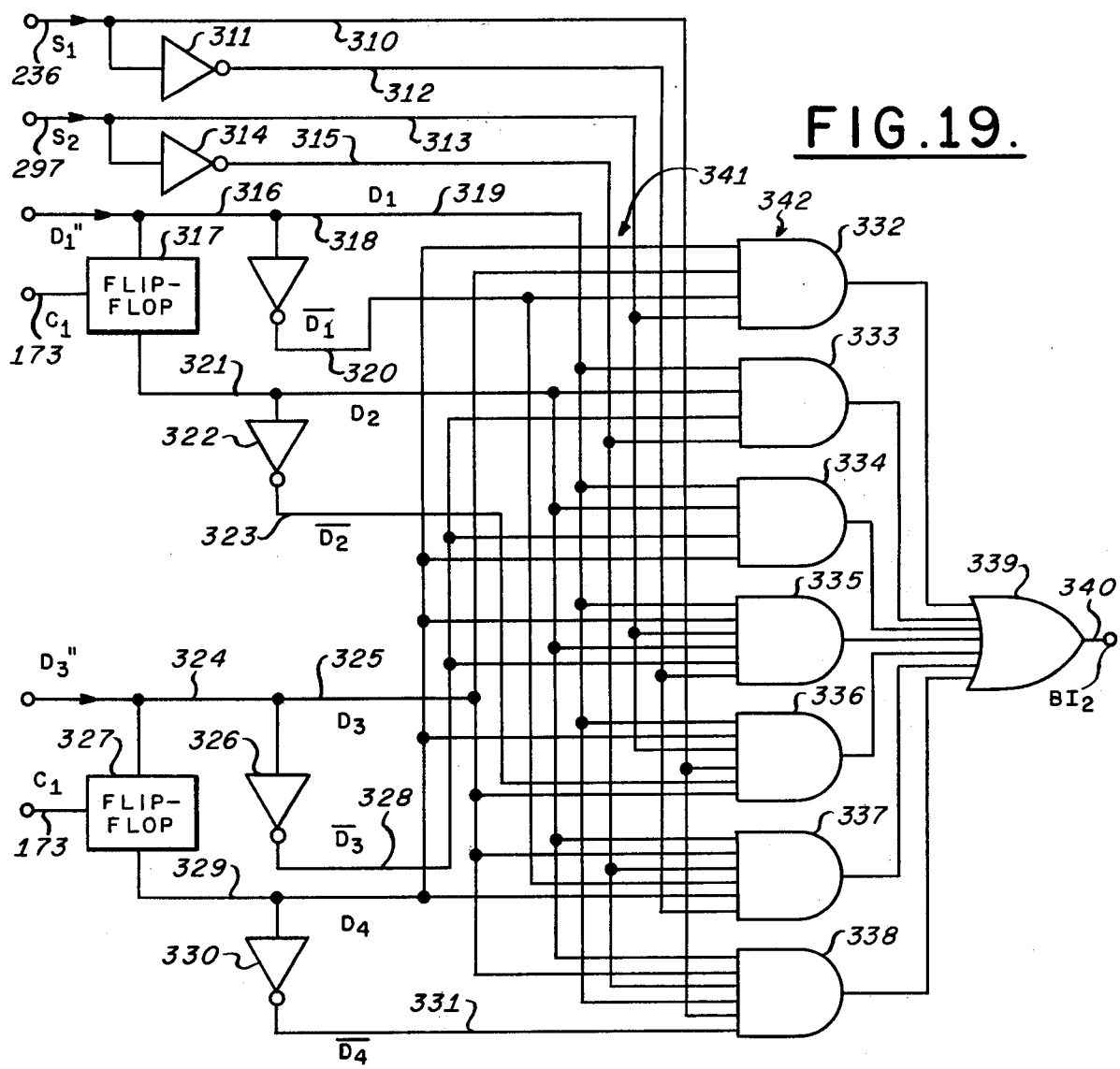
FIG. 19 is a detailed wiring diagram of the $BI_2$ generator introduced in FIG. 17.

The primary function of the $BI_2$ generator 263 of FIGS. 17, 19 is to create from the original binary image of the fingerprint pattern of FIG. 2 and modified image pattern of FIG. 3, containing only the ones at those points on the FIG. 2 image that lie on the left hand side of all fingerprint ridges independently of the angular direction of the fingerprint ridge (assuming that all ridge directions lie within the angular range between 0° and 180°). The circuit of FIG. 19 for performing the function is based directly upon the following Boolean equation based, in turn, in the conventional manner, upon the truth table of FIG. 8:

$$BI_2 = \overline{D}_1 D_3 D_4 S_2 + D_1 D_2 \overline{D}_3 \overline{S}_2 + \overline{D}_1 D_2 \overline{D}_3 D_4$$
$$+ D_1 D_4 (D_2 \overline{D}_3 \overline{S}_1 + \overline{D}_2 D_3 S_1) S_2 +$$
$$+ D_2 D_3 (\overline{D}_1 D_4 \overline{S}_1 + D_1 \overline{D}_4 S_1) \overline{S}_2$$

The device 263 for producing the modified one-sided image of FIG. 3 may be explained in more detail in connection with FIG. 19, where the desired $BI_2$ signal appears at the output terminal 340 of OR gate 339. As inputs, the two sign values $S_1$, $S_2$ are coupled directly via the respective leads 310, 313 to connection matrix 341, as shown. Inverted versions of the sign values generated by inverters 311, 314 are also respectively coupled to connector matrix 341, as shown, via leads 312, 315. Clock pulses $C_1$ and the $D_1''$ signals are supplied as inputs to a first flip flop 317, the $D_1''$ signal being coupled via leads 316, 319 as the $D_1$ signal directly to matrix 341 and also through inverter 318 and lead 320 as the $\overline{D}_1$ signal thereto. The output of flip flop 317 goes directly as the $D_2$ signal via lead 321 to matrix 341, as shown and through inverter 322 and lead 323 as the $\overline{D}_2$ signal directly to AND gate 336 of an array 342 of AND gates. Similarly, clock pulses $C_1$ and the $\overline{D}_3''$ signals are supplied as inputs to a second flip flop 327, the $D_3''$ signals being coupled via leads 324, 325 as the $D_3$ signal directly to matrix 341 and also through inverter 326 and lead 328 as the $\overline{D}_3$ signal thereto. The output of flip flop 327 goes directly via lead 329 as signal $D_4$ to matrix 341, as shown, and through inverter 330 and lead 331 as signal $\overline{D}_4$ directly to a further AND gate 338 of the array 342 of AND gates.

It will be understood that the matrix 341 performs the important function of delivering the appropriate signals to be combined by the foregoing Boolian equation to the AND gate array 342 consisting of AND gates 332, 333, 334, each having four inputs as shown in the drawing, and AND gates 335 through 338, each having six inputs as shown in the drawing. It will be understood that the combining of the outputs of the AND gate array 342 by OR gate 339, when the required inputs are present at the AND gate array 342, produces the desired $BI_2$ signal. It should further be understood that the $D_1''$ and $D_3''$ inputs to FIG. 19 are the inputs shown in FIG. 20.

LINE END DETECTOR

The data stream from the $BI_2$ generator 263 of FIG. 17 or 19 must collect the binary image information for each three by three box array 575 (FIG. 22A). The circuit 515 performing this function includes the circuits to the left of connector matrix 514 in FIG. 22 which circuits use six J-K flip flops 504 through 509 and two 512-bit shift registers 502, 503 which are understood to be clocked by the previously discussed $C_1$ clock pulses. Registers 502, 503 store two optical scan lines of data and cooperate to allow the data from three adjacent scan lines to be presented to outputs simultaneously. The six flip flops 504 through 509 provide a time delay between the input and output of one $C_1$ clock pulse duration between their inputs and their outputs at connector matrix 514 so as to allow three adjacent optical scans positions to be present simultaneously.

The nine output signals $T_1$ through $T_9$ of the three by three box collector 515 are directly coupled in the ordinary way through connector matrix 514 to individual corresponding inputs of the line-end detector 516 occupying the portion of FIG. 22 to the right of connector matrix 514. The exception is signal $T_4$, which is used twice in the line end detector 516. Circuit 516 supplies signal $T_5$, which is the central bit of the three by three pattern 575, and inhibits the E output at terminal 546 unless $T_5$ is set. The remaining eight signal bits $T_1$ through $T_4$ and $T_6$ through $T_9$ are arranged and injected into an array of AND circuits 510 through 513 and 520 through 523. Each of the AND gates of the array has one inverting and one non-inverting input, as illustrated.

This AND circuit array detects zero to one transitions while, in effect, traversing the periphery of the three by three pattern 575 of FIG. 22A. No one AND circuit in the array will have a one output unless two neighboring peripheral bits have opposite states. Each excited AND gate output therefore indicates an additional line converging toward the center of the three by three box 575 of FIG. 22A. No two adjacent AND circuits in the array 510 to 513 and 520 to 523 can be excited simultaneously; hence, the paired outputs of the AND gate array may be coupled, as shown, to respective OR gates 524 through 527, yielding only four outputs. This result is merely a restatement of the fact that no more than four lines can converge toward the common center of pattern 575 (FIG. 22A). As previously explained, an odd number of converging lines indicates a line-end pattern, whereas an even number of converging lines indicates a line-continuation pattern. Hence, the function of the remaining part of the circuit, including the second array of AND gates 528 through 531 and 540 through 543 which forms inputs to the common OR gate 544 is to supply an output if only one of the four OR gates 524 through 527 is excited or if three of those four OR gates are excited. The odd-line signal output of OR gate 544 is coupled to AND gate 545 along with the $T_5$ signal to yield the final line-end recognition signal E at a terminal 546.

It is observed that the T outputs of connector matrix 514 refer to binary image values of the three by three box of FIG. 22A. A side from $T_5$, the central bit, the bits are in order as the box is traversed circumferentially from $T_1$. This clockwise progression is necessary for the AND gate array 510 to 523 and OR gate array 524 to 527 to count zero to one transitions around that circumference. No AND gate of gates 510 to 523 will have a one output unless a zero to one change is observed during the clockwise progression. The matrix 517 and AND gates 528 through 543 check for the presence of one or three of the zero to one transitions. Note that the AND gates of array 528 to 543 generally have distinct numbers of inverting and non-inverting inputs, as shown in the drawing. The output of OR gate 544 is a one only if one or three of the OR gates 524 through 527 have one outputs. Of course, the inputs and outputs of matrix 514 correspond directly.

CONCLUSION

It will be understood that the functions described in the aforementioned steps all involve processing of the fingerprint image data and are of an inherent nature such that they would be carried out too slowly if carried out by software programming of a conventional universal data processor, there being some 16,000 words of image data to be manipulated according to the invention. It is therefore generally preferable to carry out the aforedescribed steps using hard-wired apparatus, as described. Further, the essence of the present invention lies in the apparatus and methods of its use as described to this point. Any remaining processing steps are similar in general nature to the ordinary storing and correlating types of steps conventionally performed in fingerprint identification by an ordinary universal processor programmed by well known, simple soft-ware programs. This approach is justified on the ground that there exist only 500 to 1000 line-end patterns per fingerprint, which data is relatively easily handled by the soft-ware computing approach. Moreover, the data can now be handled as words rather than as individual bits in an image pattern.

Figure 23:
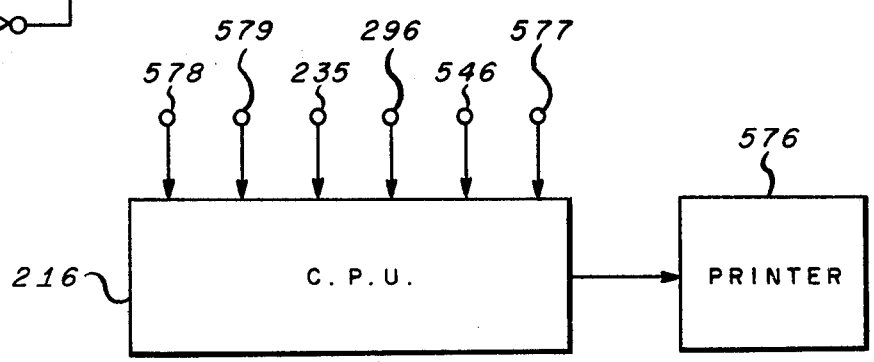
FIG. 23 is a block diagram illustrating the injection of data derived according to the invention into a conventional central processing unit for future use in a manner forming no necessary part of the present invention.

For example, it is assumed in FIG. 23, that the conventional processor 216 contains an internal storage unit of the usual type in which incoming data may be stored. According to the present invention, the data thus provided by the invention for storage will include:
 (a) x coordinate line end position on terminal 578 (terminal 170 of FIG. 12);
 (b) y coordinate line end position on terminal 579 (terminals 171, 172 of FIG. 12);
 (c) $Z_1$-$Z_3$ ridge angle values from terminal 235 of FIG. 18;
 (d) $Z_2$-$Z_4$ ridge angle values from terminal 256 of FIG. 18, and
 (e) eight bits indicating the particular three by three box pattern recognized as representing a line end.
These eight bits are the three by three box designations $T_1$- $T_9$, less $T_5$, which is known to be in the one state. The bits appear at the connector matrix 514 output.

The E signal at the output 546 of AND gate 545 is supplied, as in FIG. 23, to terminal 546 of the conventional computer or data processor 216, since the E signal indicates the presence of a line end pattern. At terminal 546, the E signal enables the transfer of x, y coordinate and $Z_1$-$Z_3$, $Z_2$-$Z_4$ ridge angle data and the three by three box pattern data into computer 216. Hence, the E signal as an input to computer 216 indicating that minutiae descriptions are available for transfer. In general, the transfer is handled in the manner in which accumulated data is normally transferred into a data processor in the fingerprint processing art or other similar arts. The output of computer 216 would be coupled in the usual manner to an output printer on other utilization device 576.

While the invention has been described in its preferred embodiments, it is understood that the words which have been used are words of description rather than of limitation and that changes may be made within the purview of the appended claims without departing from the true scope and spirit of the invention in its broadest aspects.

What is claimed is:
1. The method of recognizing a pattern of lines lying substantially in a single plane including the steps of:
 scanning said pattern of lines in a synchronized manner,
 generating a first flow of binary data corresponding to the presence or absence of lines in successive locations of said scanned pattern of lines,
 decoding said first flow of binary data, thereby generating a second flow of binary data representing the locations of only a predetermined side of each of said lines,
 locating from said second flow of binary data the locations of end points of said one side of each of said lines, and
 generating a control signal in response to location of said end points for transferring said data to processor means for selecting only said locations of end points not lying in substantially colineal proximate relation to an associated end point.

2. The method of recognizing a pattern of lines lying in a substantially common plane including the steps of:
 scanning said pattern of lines for providing a first flow of binary data representative of the respective angular orientations of said lines,
 utilizing said first flow of binary data for providing a second stream of binary data representing the locations of one side only of each of said lines,
 locating minutiae in the form of endings of said one side of each of said lines,
 storing at least said data representative of the respective angular orientations of said lines, and
 additionally storing selected locations of said minutiae.

3. In a pattern identification apparatus:
 energy source means for illuminating a predetermined portion of a pattern of lines,
 deflector means for raster scanning said illumination over said pattern of lines,
 detector means responsive to energy scattered from individual lines of said pattern of lines,
 pulse shaper means responsive to said detector means for converting the output thereof into a first flow of binary data,
 a plurality of n serially connected shift register means having an input receiving said first flow of binary data, first and second shift register-counter means,
  said first shift register-counter means being responsive to the first of said plurality of shift register means,
  said second shift register-counter means being responsive to the second of said plurality of shift register means,
  generator means for generating a second flow of binary data representative of one side line binary data,
    said generator means being responsive to the nth and $(n-1)^{th}$ of said plurality of shift register means and to said first and second shift register-counter means.

4. Apparatus as described in claim 3 further including line ridge angle decoder means responsive to the first and second of said shift register means and having plural outputs representing totals of each of a plurality of sampled line angular data.

5. Apparatus as described in claim 4 including: master clock means,
  first OR gate means responsive to first and second of said plural outputs,
  first UP-DOWN multi-bit counter means responsive to said first OR gate means, to said first output, and to said master clock means, and
  first shift register means responsive to said first UP-DOWN counter means and to said master clock means,
  said first UP-DOWN counter means being further responsive to said first shift register means.

6. Apparatus as described in claim 5 wherein:
  said master clock means yields first and second clock pulse trains of respective first and second repetition rates,
  said first shift register means includes input enable and output enable means responsive to said first clock pulse train of first repetition rate, and
  said first UP-DOWN counter means includes preset enable means additionally responsive to said first clock pulse train of first repetition rate.

7. Apparatus as described in claim 6 wherein said first UP-DOWN counter means includes:
  data input means responsive to said AND gate means, and
  data enable means responsive to said second clock pulse train of second repetition rate.

8. Apparatus as described in claim 7 wherein said first UP-DOWN counter means generates a flow of binary data representing the sign of said first UP-DOWN counter means outputs.

9. Apparatus as described in claim 5 further including:
  second OR gate means responsive to third and fourth of said plural outputs,
  second UP-DOWN counter means responsive to said second OR gate means, to said third output, and to said clock means, and
  second shift register means responsive to said second UP-DOWN counter means and to said master clock means,
  said second UP-DOWN counter means being further responsive to said second shift register means.

10. Apparatus as described in claim 9 wherein said second UP-DOWN counter means generates a flow of binary data representing the sign of said second UP-DOWN counter means outputs.

11. In a pattern identification apparatus:
  energy source means for illumination of successive portions of a pattern of lines,
  deflector means for raster scanning said illumination over said pattern of lines,
  detector means responsive to energy scattered from individual lines of said pattern of lines,
  pulse shaper means responsive to said detector means for converting the output thereof into a first flow of binary data,
  master clock means,
  a first plurality of n serially connected shift register means having input means receiving said first flow of binary data and having output means,
  a second plurality of n serially connected shift register means having input means responsive to said output means,
  first line angle decoder means responsive to said flow of binary data and to the first of said first plurality of n serially connected shift register means,
  second line angle decoder means responsive to said $(n-1)^{th}$ and said $n^{th}$ shift register means of said second plurality of n serially connected shift register means,
  first and second sign generator means both responsive to said first and second line angle decoder means, and
  third generator means for generating a second flow of binary data representative to one side line binary data,
    said third generator means being responsive to said first and second sign generator means, to the $n^{th}$ of said first plurality of n serially connected shift register means and to the first of said second plurality of n serially connected shift register means.

12. Apparatus as described in claim 11 wherein said third generator means comprises:
  plural AND gate means,
  OR gate means responsive to said plural AND gate means for producing said second flow of binary data,
  coupling matrix means for selectively activating individual gates of said plural AND gate means,
  first coupling means for direct and inverted coupling of versions of said outputs of said first and second sign generator means into said coupling matrix means, and
  second coupling means for direct, delayed, and inverted coupling versions of said outputs of said $n^{th}$ of said first plurality of n serially connected shift register means and of said first of said second plurality of n serially connected shift register means into said coupling matrix means,
    said second coupling means including bistable means additionally responsive to said master clock means.

13. In a pattern identification apparatus:
scanning means for regularly scanning a substantially planar pattern of lines in a plurality of locations for producing an output upon traversal of each said line,
synchronizer means,
timing pulse generator means,
said timing pulse generator means and said scanner means being responsive to said synchronizer means,
first decoder means responsive to the presence or absence of lines at successive locations in said scanned planar pattern of lines and to said timing pulse generator means for generating a first flow of binary data, and first discriminator means responsive to said first decoder means for locating selected end points of each said line, said timing pulse generator means including:

first, second, third, and fourth counter means in series connection, flip flop means having set, reset, and output terminals, and AND gate means, said flip flop means set terminal being responsive to said synchronizer means, said AND gate means being responsive to said first counter means and to said flip flop means output terminal output for forming clock pulses of a first repetition frequency, said second counter means being responsive to said AND gate means for forming clock pulses of a second repetition frequency, said third counter means being responsive to said second counter means for forming clock pulses of a third repetition frequency, said fourth counter means being responsive to said third counter means for forming clock pulses of a fourth repetition frequency, said flip flop means reset terminal being responsive to said fourth counter means, and said first counter means being responsive to said master clock means.

14. Apparatus as described in claim 13 wherein:

said first and second counter means include reset terminals, and said first and second counter reset terminals are responsive to the output of said flip flop means.

15. Apparatus as described in claim 14 wherein said third and fourth counter means are cooperatively responsive for generating a flow of binary data instantaneously representative of a second coordinate of said scanning means position.

16. In a pattern identification apparatus:

synchronizer means, scanning means for regularly scanning a substantially planar pattern of lines in a plurality of locations for producing an output upon traversal of each said line and including:

energy source means for illuminating a predetermined portion of said pattern of lines, deflector means responsive to said synchronizer means for raster scanning said illumination over said pattern of lines, and detector means responsive to energy scattered from individual lines of said pattern of lines, timing pulse generator means, said timing pulse generator means and said scanning means being responsive to said synchronizer means, first decoder means responsive to the presence or absence of lines at successive locations in said scanned planar pattern of lines and to said timing pulse generator means for generating a first flow of binary data, first discriminator means responsive to said first decoder means for locating selected end points of each said line, pulse forming means responsive to said detector means for converting the output thereof into said first flow of binary data, storage circuit means responsive to said pulse forming means and to said synchronizer means for storing successive trains of said flow of said first binary data through a predetermined number of successive scans of said deflector means and having plural parallel output means, and line angle decoder means responsive to said plural parallel output means for supply of a further flow of binary data representing totals of each of a plurality of sampled line angular data.

17. In a pattern identification apparatus:

synchronizer means, scanning means for regularly scanning a substantially planar pattern of lines in a plurality of locations for producing an output upon traversal of each said line and including energy source means for illuminating a predetermined portion of said pattern of lines, deflector means responsive to said synchronizer means for raster scanning said illumination over said pattern of lines, and detector means responsive to energy scattered from individual lines of said pattern of lines, timing pulse generator means, said timing pulse generator means and said scanning means being responsive to said synchronizer means, first decoder means responsive to the presence or absence of lines at successive locations in said scanned planar pattern of lines and to said timing pulse generator means for generating a first flow of binary data, first discriminator means responsive to said first decoder means for locating selected end points of each said line, pulse forming means responsive to said detector means for converting said detector means output into said first flow of binary data, first and second flip flop means responsive to said synchronizer means and having first and second respective output means, shift register means responsive to said synchronizer means and having third output means, said first flip flop means and said shift register means being additionally responsive to said pulse forming means, said second flip flop means being additionally responsive to said shift register means, and decoder means responsive to said first, second, and third output means and to said pulse forming network means.

* * * * *